US012764740B2

(12) United States Patent
Su et al.

(10) Patent No.: US 12,764,740 B2
(45) Date of Patent: Oct. 13, 2026

(54) METHOD, TERMINAL AND BASE STATION IN A WIRELESS COMMUNICATION SYSTEM

(71) Applicant: Samsung Electronics Co., Ltd., Suwon-si (KR)

(72) Inventors: Di Su, Beijing (CN); Yi Wang, Beijing (CN); Chen Qian, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 18/681,349

(22) PCT Filed: Aug. 12, 2022

(86) PCT No.: PCT/KR2022/012113

§ 371 (c)(1),
(2) Date: Feb. 5, 2024

(87) PCT Pub. No.: WO2023/018294

PCT Pub. Date: Feb. 16, 2023

(65) Prior Publication Data

US 2024/0340894 A1 Oct. 10, 2024

(30) Foreign Application Priority Data

Aug. 13, 2021 (CN) ......................... 202110932885.9

(51) Int. Cl.
*H04W 72/0446* (2023.01)
*H04L 5/14* (2006.01)
(Continued)

(52) U.S. Cl.
CPC ....... *H04W 72/1268* (2013.01); *H04L 5/1469* (2013.01); *H04W 72/0446* (2013.01); *H04W 72/0453* (2013.01); *H04W 72/231* (2023.01)

(58) Field of Classification Search
CPC ......... H04W 72/0446; H04W 72/0453; H04W 72/1263; H04W 72/231; H04L 5/1469
See application file for complete search history.

(56) References Cited

U.S. PATENT DOCUMENTS 11,770,825 B2 * 9/2023 Bae ....................... H04W 72/51 370/329
2019/0313377 A1 10/2019 Abdoli et al.
(Continued)

FOREIGN PATENT DOCUMENTS

WO 2021/150787 A2 7/2021

OTHER PUBLICATIONS

International Search Report and written opinion dated Nov. 14, 2022, issued in International Application No. PCT/KR2022/012113.

*Primary Examiner* — Kent Krueger
(74) *Attorney, Agent, or Firm* — Jefferson IP Law, LLP

(57) ABSTRACT

The disclosure relates to a 5G or 6G communication system for supporting a higher data transmission rate. The present disclosure discloses a method, a terminal and a base station in a wireless communication system. A method performed by a terminal in a wireless communication system according to embodiments of the present disclosure may include: obtaining one or more first configuration information for transmitting and/or receiving a physical channel or physical signal; and transmitting and/or receiving the physical channel or physical signal based on the one or more first configuration information. According to the method provided by the present disclosure, reception performance of physical channels or physical signals under the condition of self-interference can be improved.

20 Claims, 11 Drawing Sheets

(51) Int. Cl.
*H04W 72/0453* (2023.01)
*H04W 72/1268* (2023.01)
*H04W 72/231* (2023.01)

(56) References Cited

U.S. PATENT DOCUMENTS

| | | | | |
|---|---|---|---|---|
| 2020/0137780 | A1* | 4/2020 | Kim | H04W 72/0453 |
| 2020/0236670 | A1 | 7/2020 | Xiong et al. | |
| 2020/0259586 | A1 | 8/2020 | Seo et al. | |
| 2021/0410181 | A1* | 12/2021 | Jeon | H04W 52/0258 |
| 2022/0046661 | A1* | 2/2022 | Jeon | H04W 72/23 |
| 2022/0046750 | A1* | 2/2022 | Jeon | H04W 36/06 |
| 2023/0308228 | A1* | 9/2023 | Alfarhan | H04L 1/1887 |
| 2023/0412328 | A1* | 12/2023 | Seok | H04L 5/0012 |
| 2024/0155577 | A1* | 5/2024 | Li | H04L 5/0051 |
| 2024/0323856 | A1* | 9/2024 | Ali | H04W 52/325 |

* cited by examiner

METHOD, TERMINAL AND BASE STATION IN A WIRELESS COMMUNICATION SYSTEM

CROSS-REFERENCE TO RELATED APPLICATION(S)

This application is a U.S. National Stage application under 35 U.S.C. § 371 of an International application number PCT/KR2022/012113, filed on Aug. 12, 2022, which is based on and claims the benefit of a Chinese application number 202110932885.9, filed on Aug. 13, 2021, in the Chinese Intellectual Property Office, the disclosure of which is incorporated by reference herein in its entirety.

TECHNICAL FIELD

The present disclosure relates to a technical field of wireless communication, and more particularly to a method, a terminal and a base station in a wireless communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

DISCLOSURE

Technical Solution

Embodiments of the present disclosure provide a method performed by a terminal in a wireless communication system, which includes: obtaining one or more first configuration information for transmitting and/or receiving a physical channel or physical signal; and transmitting and/or receiving the physical channel or physical signal based on the one or more first configuration information.

Embodiments of the present disclosure provide a terminal in a wireless communication system, which includes: a transceiver configured to transmit and receive signals; and a processor configured to perform methods performed by a terminal in a wireless communication system according to embodiments of the present disclosure.

Embodiments of the present disclosure provide a method performed by a base station in a wireless communication system, which includes: transmitting one or more first configuration information for transmitting and/or receiving a physical channel or physical signal; and receiving and/or transmitting the physical channel or physical signal, wherein the physical channel or physical signal is transmitted and/or received based on the first configuration information.

Embodiments of the present disclosure provide a base station in a wireless communication system, which includes: a transceiver configured to transmit and receive signals; and a processor configured to perform methods performed by a base station in a wireless communication system according to embodiments of the present disclosure.

Embodiments of the present disclosure provide a computer-readable medium having stored thereon computer-readable instructions which, when executed by a processor, implement methods performed by a terminal in a wireless communication system or methods performed by a base station in a wireless communication system according to embodiments of the present disclosure.

The present disclosure provides a method for transmitting and/or receiving a physical channel or physical signal, which can improve the reception performance of the physical channel or physical signal under a condition of self-interference.

DESCRIPTION OF DRAWINGS

The above and other aspects, features and advantages of certain embodiments of the present disclosure will be more apparent from the following description taken in conjunction with the accompanying drawings, in which.

MODE FOR INVENTION

Figure 1:
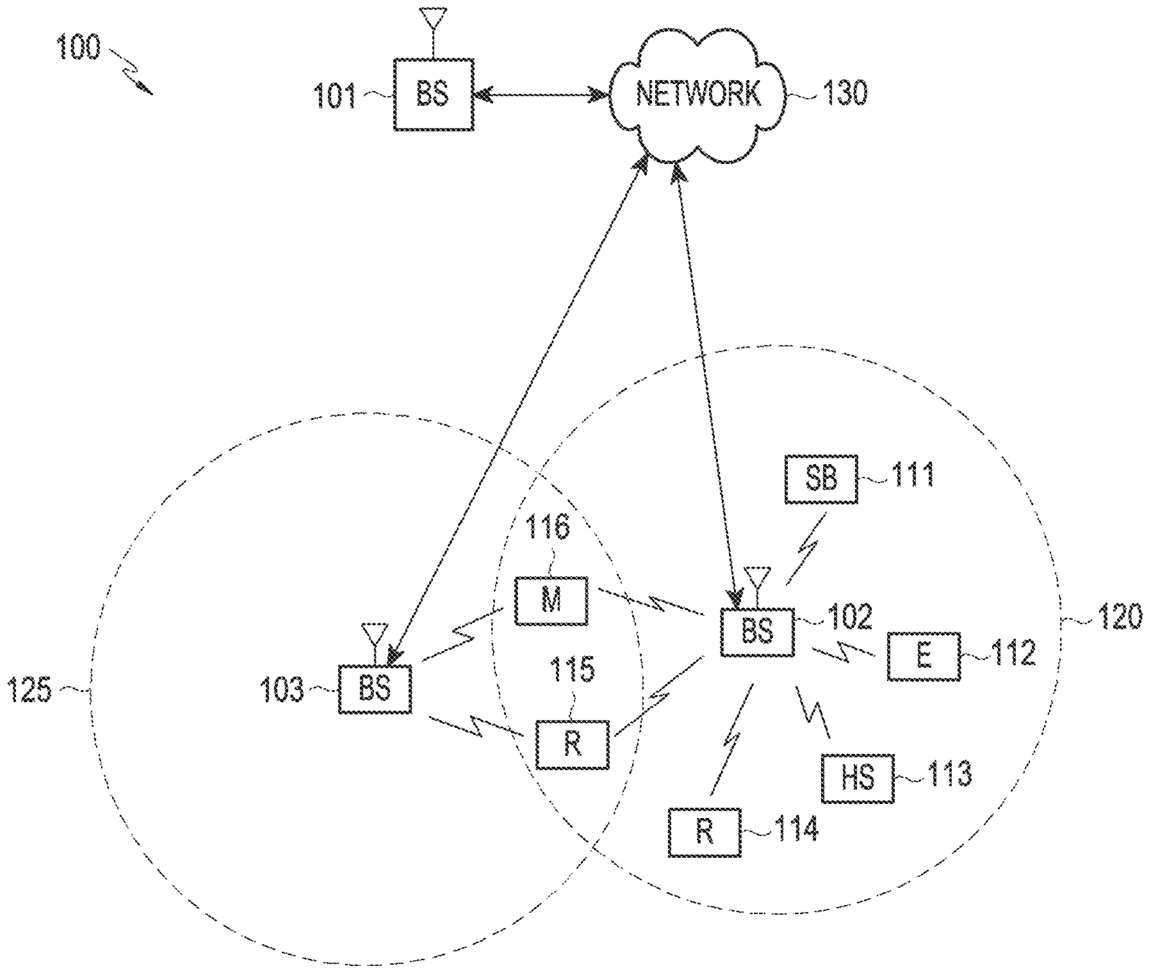
FIG. 1 illustrates an example wireless network according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Embodiments of the present disclosure provide a method performed by a terminal in a wireless communication system, which includes: obtaining one or more first configuration information for transmitting and/or receiving a physical channel or physical signal; and transmitting and/or receiving the physical channel or physical signal based on the one or more first configuration information.

According to an embodiment of the present disclosure, wherein the physical channel or physical signal is an uplink channel or uplink signal in a first format, wherein at least one of the one or more first configuration information is second configuration information for frequency-domain resources for transmitting the uplink channel or uplink signal, and wherein a mapping mode of the uplink channel or uplink signal in the first format includes: generating a first sequence based on the second configuration information; and mapping the first sequence on one or more time-domain symbols for transmitting the uplink channel or uplink signal.

According to an embodiment of the present disclosure, wherein generating a first sequence based on the second configuration information includes: determining the total number of uplink-available subcarriers contained in frequency-domain resources for transmitting the uplink channel or uplink signal based on the second configuration information; and generating a first sequence with a first length, wherein the first length is the same as the total number of the uplink-available subcarriers.

According to an embodiment of the present disclosure, wherein generating a first sequence based on the second configuration information includes: determining frequency-domain resources for transmitting the uplink channel or uplink signal based on the second configuration information; generating a first sequence with a second length, wherein the second length is a fixed length; and generating one or more first duplicate sequences of the first sequence with the second length, and wherein mapping the first sequence on one or more time-domain symbols for transmitting the uplink channel or uplink signal includes: mapping the first sequence and the one or more first duplicate sequences to frequency-domain resources for transmitting the uplink channel or uplink signal on the N-th time-domain symbol of the one or more time-domain symbols, where N is a positive integer less than or equal to the number of the one or more time-domain symbols.

According to an embodiment of the present disclosure, wherein mapping the first sequence on one or more time-domain symbols for transmitting the uplink channel or uplink signal includes: generating one or more second duplicate sequences of the first sequence, wherein the number of the one or more second duplicate sequences is determined based on the number of the one or more time-domain symbols; and mapping each of the first sequence and the one or more second duplicate sequences to frequency-domain resources for transmitting the uplink channel or uplink signal on each of the one or more time-domain symbols, respectively.

According to an embodiment of the present disclosure, wherein mapping the first sequence on one or more time-domain symbols for transmitting the uplink channel or uplink signal includes: generating one or more third duplicate sequences of a third sequence, wherein the third sequence is a combined sequence of the first sequence and the one or more first duplicate sequences, wherein the number of the one or more third duplicate sequences is determined based on the number of the one or more time-domain symbols; and mapping each of the third sequence and the one or more third duplicate sequences to frequency-domain resources for transmitting the uplink channel or uplink signal on each of the one or more time-domain symbols, respectively.

According to an embodiment of the present disclosure, wherein each of the one or more first duplicate sequences is the same sequence as the first sequence or a sequence with a different cyclic shift value generated based on the first sequence.

According to an embodiment of the present disclosure, wherein obtaining the second configuration information for frequency-domain resources for transmitting the uplink channel or uplink signal includes: obtaining location information of frequency-domain resources for transmitting the uplink channel or uplink signal based on an indication of higher layer signaling and/or downlink control information, wherein the location information includes at least two of the following: an index or relative index of a starting physical resource block of the frequency-domain resources for transmitting the uplink channel or uplink signal, the number of physical resource blocks of the frequency-domain resources for transmitting the uplink channel or uplink signal, and an index or relative index of an ending physical resource block of the frequency-domain resources for transmitting the uplink channel or uplink signal.

According to an embodiment of the present disclosure, the method further includes: determining time units for transmitting the uplink channel or uplink signal based on a channel format of the uplink channel or uplink signal, wherein when the uplink channel or uplink signal is in a specific format, the time units for transmitting the uplink channel or uplink signal include specific downlink time units, wherein the specific downlink time units include at least one of the following: a time unit configured as downlink in a time division duplex (TDD) uplink and downlink configuration configured by radio resource control (RRC) signaling; a time unit configured as downlink in a slot format indication (SFI) configured by downlink control information (DCI); a time unit configured as flexible in a TDD uplink and downlink configuration configured by RRC signaling, and on which common downlink transmission is configured; and a time unit configured as flexible in a slot format indication (SFI) configured by DCI, and on which common downlink transmission is configured, wherein the specific format includes at least one of the first format, uplink control channel format 0 and uplink control channel format 1.

According to an embodiment of the present disclosure, wherein at least one of the one or more first configuration information is third configuration information for transmission power boosting for the uplink channel or uplink signal, and wherein the method further includes: performing transmission power boosting for the uplink channel or uplink signal based on the third configuration information, wherein the uplink channel or uplink signal for which the transmission power boosting is performed is in at least one of the first format, uplink control channel format 0 and uplink control channel format 1.

According to an embodiment of the present disclosure, wherein the third configuration information includes at least one of the following: information indicating to enable/disable transmission power boosting for the uplink channel or uplink signal; information indicating to enable/disable transmission power boosting for an uplink channel or uplink signal in a specific format; information indicating time-domain symbols applicable to the transmission power boosting for the uplink channel or uplink signal; and information indicating time-domain symbols applicable to the transmission power boosting for an uplink channel or uplink signal in a specific format, wherein the specific format includes at least one of the first format, uplink control channel format 0 and uplink control channel format 1.

According to an embodiment of the present disclosure, wherein at least one of the one or more first configuration information is fourth configuration information for uplink and/or downlink interleaving mapping, wherein the method further includes: applying uplink and/or downlink interleaving mapping based on the fourth configuration information, wherein types of the fourth configuration information includes at least one of the following: uplink interleaving mapping configuration information for transmitting uplink channels and/or uplink signals; downlink interleaving mapping configuration information for receiving downlink channels and/or downlink signals; and uplink and downlink interleaving mapping configuration information for transmitting uplink channels and/or uplink signals and receiving downlink channels and/or downlink signals.

According to an embodiment of the present disclosure, wherein obtaining the fourth configuration information includes obtaining at least one of the following: information indicating to enable/disable uplink and/or downlink interleaving mapping; interleaving mapping pattern for uplink and/or downlink interleaving mapping; types of physical channels for applying uplink and/or downlink interleaving mapping; types of physical signals for applying uplink and/or downlink interleaving mapping; time units for applying uplink and/or downlink interleaving mapping; and frequency units for applying uplink and/or downlink interleaving mapping.

According to an embodiment of the present disclosure, wherein time-domain symbols for transmitting an uplink channel and/or uplink signal and/or receiving a downlink channel and/or downlink signal are one or more time-domain symbols, and wherein the interleaving mapping pattern for uplink and/or downlink interleaving mapping includes a first interleaving mapping pattern, wherein the first interleaving mapping pattern includes at least one of the following: on each of the one or more time-domain symbols, mapping the uplink channel and/or uplink signal on a first set of subcarriers within the time-domain symbol, and mapping the downlink channel and/or downlink signal on a second set of subcarriers within the time-domain symbol, wherein the first set of subcarriers is one of a set of subcarriers with odd indexes within the time-domain symbol or a set of subcarriers with even indexes within the time-domain symbol, and the second set of subcarriers is a set of subcarriers other than the first set of subcarriers within the time-domain symbol; on each of the one or more time-domain symbols, mapping the uplink channel and/or uplink signal on a third set of subcarriers within the time-domain symbol, wherein the third set of subcarriers is one of a set of subcarriers with odd indexes within the time-domain symbol or a set of subcarriers with even indexes within the time-domain symbol; and on each of the one or more time-domain symbols, mapping the downlink channel and/or downlink signal on a fourth set of subcarriers within the time-domain symbol, wherein the fourth set of subcarriers is one of a set of subcarriers with odd indexes within the time-domain symbol or a set of subcarriers with even indexes within the time-domain symbol.

According to an embodiment of the present disclosure, wherein time-domain symbols for transmitting an uplink channel and/or uplink signal and/or receiving a downlink channel and/or downlink signal are one or more time-domain symbols, and wherein the interleaving mapping pattern for uplink and/or downlink interleaving mapping includes a second interleaving mapping pattern, wherein the second interleaving mapping pattern includes at least one of the following: on each of the one or more time-domain symbols, mapping the uplink channel and/or uplink signal on a fifth set of subcarriers within the time-domain symbol, and mapping the downlink channel and/or downlink signal on a sixth set of subcarriers within the time-domain symbol, wherein the fifth set of subcarriers is one of a set of subcarriers with indexes of 4 k within the time-domain symbol or a set of subcarriers with indexes of 4 k+2 within the time-domain symbol, and the sixth set of subcarriers is the other one of the set of subcarriers with indexes of 4 k within the time-domain symbol or the set of subcarriers with indexes of 4 k+2 within the time-domain symbol; on each of the one or more time-domain symbols, mapping the uplink channel and/or uplink signal on a seventh set of subcarriers within the time-domain symbol, wherein the seventh set of subcarriers is one of a set of subcarriers with indexes of 4 k within the time-domain symbol or a set of subcarriers with indexes of 4 k+2 within the time-domain symbol; and on each of the one or more time-domain symbols, mapping the downlink channel and/or downlink signal on an eighth set of subcarriers within the time-domain symbol, wherein the eighth set of subcarriers is one of a set of subcarriers with indexes of 4 k within the time-domain symbol or a set of subcarriers with indexes of 4 k+2 within the time-domain symbol, where k is an integer greater than or equal to 0.

According to an embodiment of the present disclosure, wherein obtaining time units for applying uplink and/or downlink interleaving mapping includes at least one of the following: obtaining indexes or relative indexes of time units for applying uplink and/or downlink interleaving mapping through higher layer signaling or downlink control information (DCI); determining time units configured for a specific uplink channel and/or uplink signal and a specific downlink channel and/or downlink signal as time units for applying uplink and downlink interleaving mapping; determining time units configured for a specific uplink channel and/or uplink signal as time units for applying uplink interleaving mapping; and determining time units configured for a specific downlink channel and/or downlink signal as time units for applying downlink interleaving mapping, wherein the time units include at least one of the following: time-domain symbols, slots, subframes, radio frames and mini-slots, wherein the specific uplink channel includes at least one of uplink control channel format 0, uplink control channel format 1 and an uplink channel in a first format, the specific uplink signal includes an uplink signal in a first format, the specific downlink channel includes a downlink control channel, and the specific downlink signal includes a channel state information-reference signal (CSI-RS).

According to an embodiment of the present disclosure, the method further includes: determining a duplex mode corresponding to each time-frequency resource for transmitting and/or receiving the physical channel or physical signal, and according to the duplex mode corresponding to each time-frequency resource, determining a transmitting and receiving mode corresponding to the time-frequency resource.

According to an embodiment of the present disclosure, wherein determining a duplex mode corresponding to each time-frequency resource for transmitting and/or receiving the physical channel or physical signal includes: determining an uplink and downlink configuration for each time-frequency resource according to higher layer signaling or physical layer signaling; and determining the duplex mode corresponding to each time-frequency resource according to the uplink and downlink configuration.

Embodiments of the present disclosure provide a terminal in a wireless communication system, which includes: a transceiver configured to transmit and receive signals; and a processor configured to perform methods performed by the terminal according to embodiments of the present disclosure.

Embodiments of the present disclosure provide a method performed by a base station in a wireless communication system, which includes: transmitting one or more first configuration information for transmitting and/or receiving a physical channel or physical signal; and receiving and/or transmitting the physical channel or physical signal, wherein the physical channel or physical signal is transmitted and/or received based on the first configuration information.

Embodiments of the present disclosure provide a base station in a wireless communication system, which includes: a transceiver configured to transmit and receive signals; and a processor configured to perform methods performed by the base station according to embodiments of the present disclosure.

Embodiments of the present disclosure provide a computer-readable medium having stored thereon computer-readable instructions which, when executed by a processor, implement methods performed by a terminal in a wireless communication system or methods performed by a base station in a wireless communication system according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
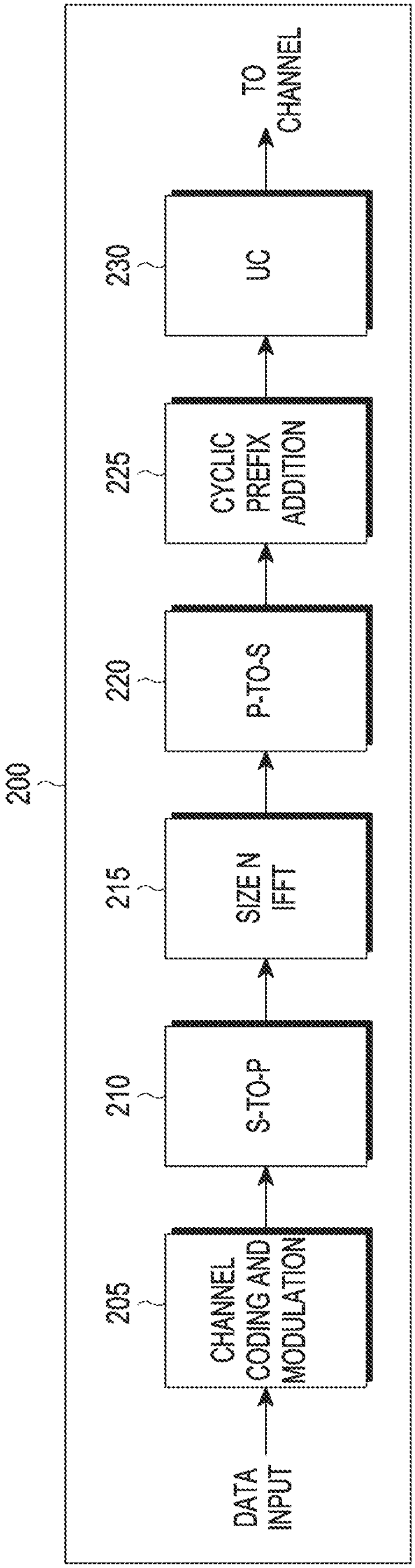
FIGS. 2*a* and 2*b* illustrate example wireless transmission and reception paths according to the present disclosure.
Figure 2B:
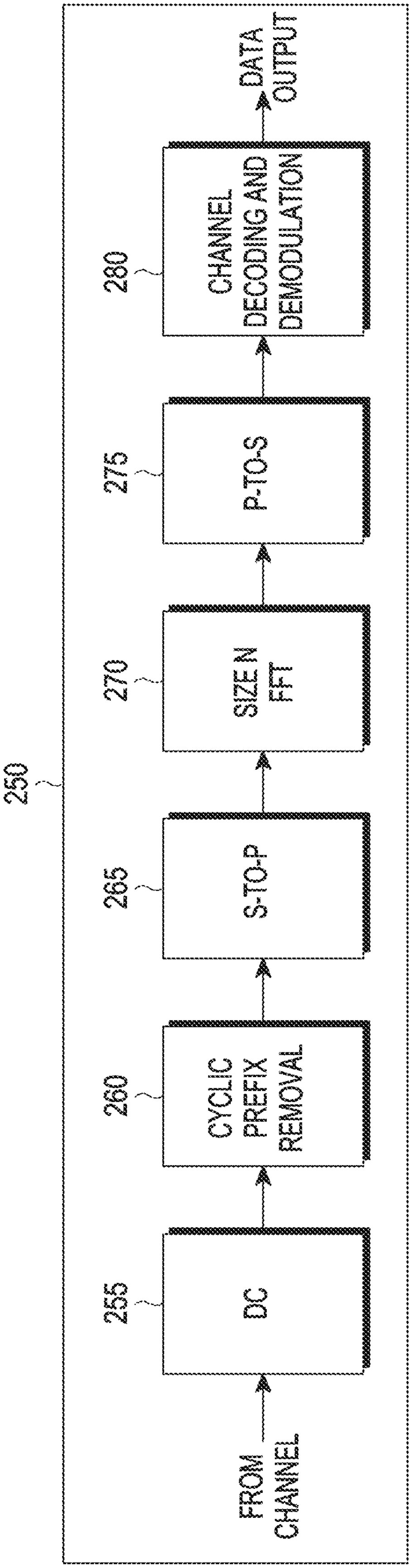

FIGS. 2*a* and 2*b* illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* illustrate examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b* are intended to illustrate examples of types of transmission and reception paths that can be used in a wireless network. Any other suitable architecture can be used to support wireless communication in a wireless network.

Figure 3A:
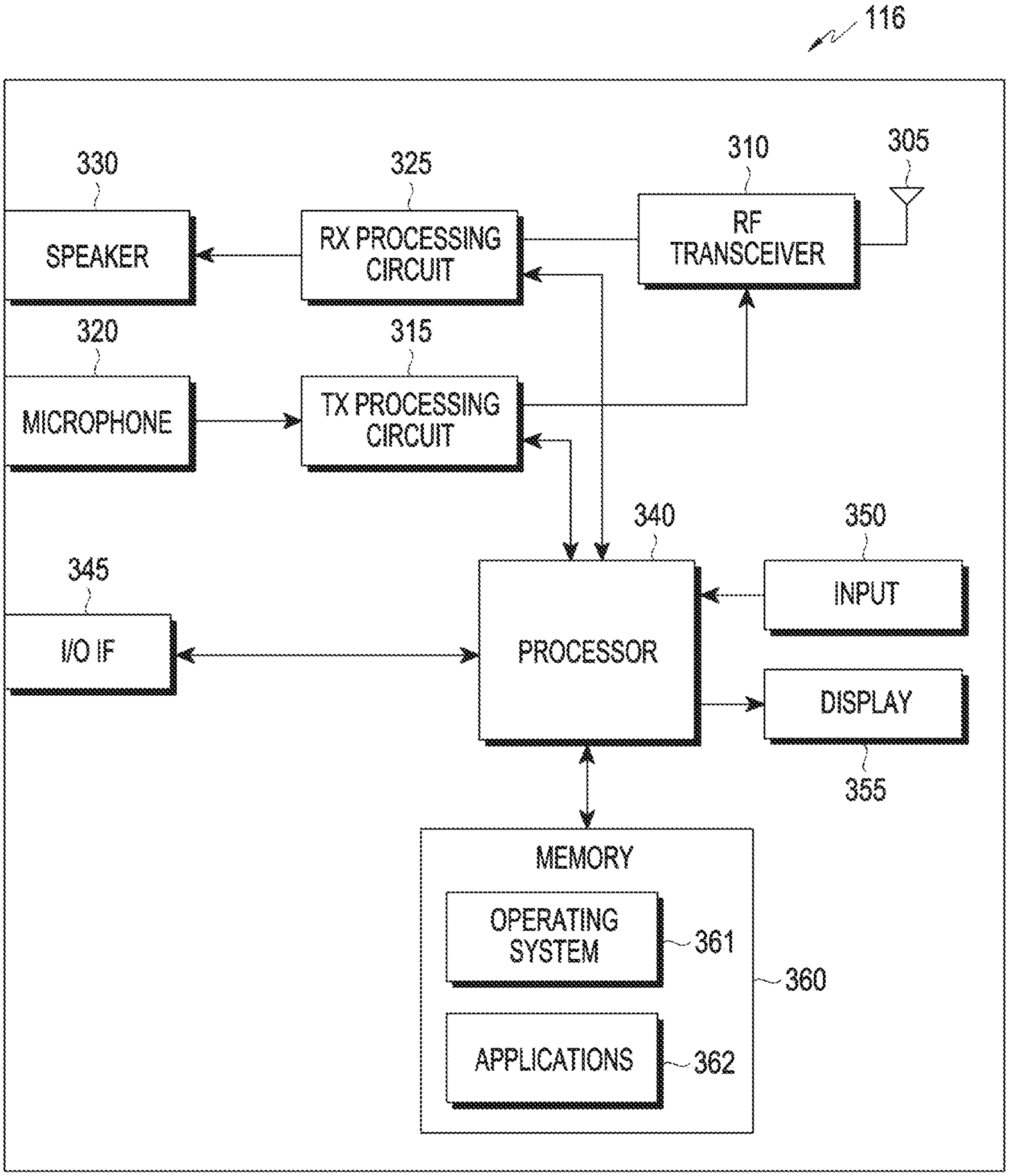
FIG. 3*a* illustrates an example UE according to the present disclosure.

FIG. 3*a* illustrates an example UE 116 according to the present disclosure. The embodiment of UE 116 shown in FIG. 3*a* is for illustration only, and UEs 111-115 of FIG. 1 can have the same or similar configuration. However, a UE has various configurations, and FIG. 3*a* does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to perform the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3*a* illustrates an example of UE 116, various changes can be made to FIG. 3*a*. For example, various components in FIG. 3*a* can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3*a* illustrates that the UE 116 is configured as a mobile phone or a smart phone, UEs can be configured to operate as other types of mobile or fixed devices.

Figure 3B:
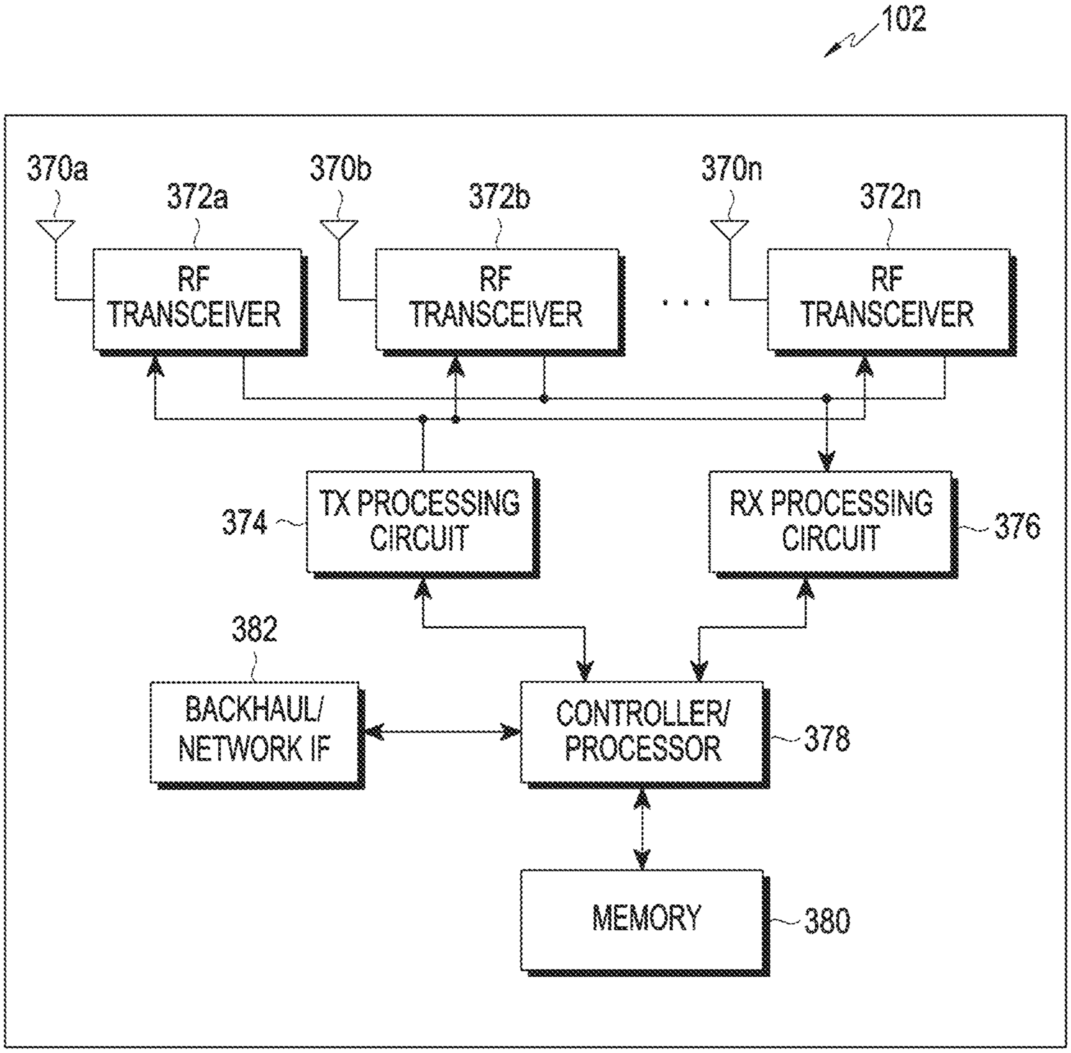
FIG. 3*b* illustrates an example gNB according to the present disclosure.

FIG. 3*b* illustrates an example gNB 102 according to the present disclosure. The embodiment of gNB 102 shown in FIG. 3*b* is for illustration only, and other gNBs of FIG. 1 can have the same or similar configuration. However, a gNB has various configurations, and FIG. 3*b* does not limit the scope of the present disclosure to any specific implementation of a gNB. It should be noted that gNB 101 and gNB 103 can include the same or similar structures as gNB 102.

As shown in FIG. 3*b*, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3*b* illustrates an example of gNB 102, various changes may be made to FIG. 3*b*. For example, gNB 102 can include any number of each component shown in FIG. 3*a*. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

In existing systems, such as LTE, NR, etc., in order to avoid self-interference caused by transmission to reception of the same communication node, it is usually ensured that there is enough frequency-domain guard interval between uplink and downlink bands, or different uplink and downlink configurations on adjacent bandwidths are avoided. An example of the former is frequency division duplex (FDD). For example, in a NR system, an interval between uplink and downlink bands may be up to about 20 MHz, which may ensure that the reception performance will not be reduced due to self-interference of adjacent bands when a base station and a terminal perform uplink transmission and downlink transmission simultaneously. An example of the latter is time division duplex (TDD). In a NR system, uplink and downlink configurations of different bandwidth parts within the system bandwidth or of multiple carriers of an in-band carrier aggregation (the frequency-domain interval between bandwidth parts or multiple carriers of a carrier aggregation is small) need to be consistent, so as to avoid self-interference between adjacent bandwidth parts or carriers.

Figure 4:
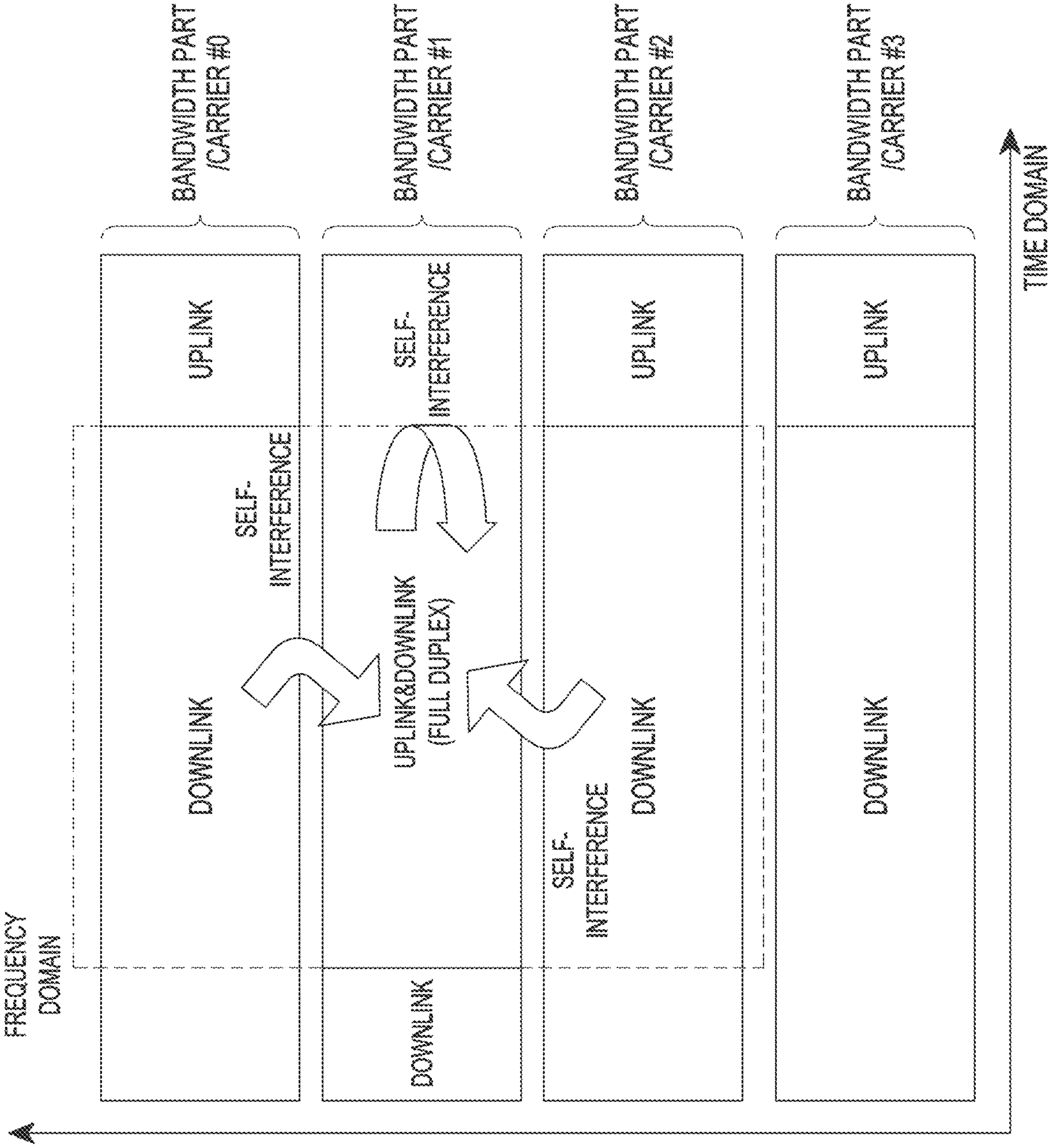
FIG. 4 illustrates a schematic diagram of an uplink and downlink configuration of a flexible duplex system according to embodiments of the present disclosure.

However, the requirement that uplink and downlink configurations of multiple bandwidth parts within the system bandwidth or multiple carriers of the carrier aggregation should be consistent may not meet the needs of users with different uplink and downlink service ratios at the same time. In an actual system, in order to ensure downlink coverage, a allocation ratio of downlink physical resources is generally higher than that of uplink physical resources, so uplink coverage may be limited for users of uplink services. To solve the problem of limited uplink coverage and improve efficiency of spectrum utilization, flexible duplex is one of the evolution directions of future mobile communication, that is, different uplink and downlink configurations are configured on different bandwidth parts within the system bandwidth or different carriers, and uplink and downlink transmissions are performed simultaneously on the same bandwidth part within the system bandwidth or the same carrier, as shown in FIG. 4. Unlike traditional FDD and TDD systems, there may be self-interference of signal transmission to signal reception between adjacent bandwidth parts or carriers, and there may also be self-interference of signal transmission to signal reception within the same bandwidth part or carrier. From a base station side, this self-interference is self-interference of downlink transmission to uplink reception; and from a terminal side, this self-interference is self-interference of uplink transmission to downlink reception. No matter for the base station or for the terminal adopting flexible duplex communication, power of transmitted self-interference signal will be much higher than power of desired reception signal, and the existence of self-interference will greatly affect the reception performance of desired signal, so how to deal with self-interference is a very critical problem for a flexible duplex system.

Figure 5:
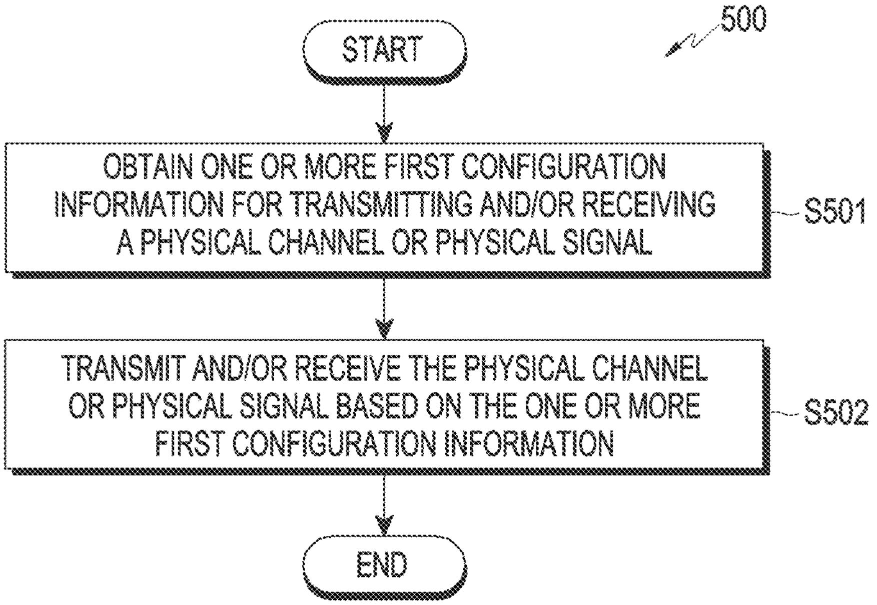
FIG. 5 illustrates a flowchart of a method for transmitting and/or receiving a physical channel or physical signal performed by a terminal in a wireless communication system according to embodiments of the present disclosure.

FIG. 5 illustrates a flowchart of a method 500 for transmitting and/or receiving a physical channel or physical signal performed by a terminal in a wireless communication system according to embodiments of the present disclosure.

As shown in FIG. 5, in step S501, a terminal may obtain one or more first configuration information for transmitting and/or receiving a physical channel or physical signal. And in step S502, the terminal may transmit and/or receive the physical channel or physical signal based on the one or more first configuration information. The method 500 performed by a terminal in a wireless communication system as shown in FIG. 5 will be further described below in conjunction with specific embodiments.

Generally, self-interference may be eliminated by antenna elimination, radio frequency elimination and digital domain elimination. It is worth noting that it is difficult to eliminate the self-interference signal until it does not affect reception of desired signal at all, for example, lower than a thermal noise of a receiver, and it will bring a corresponding cost increase. For implementation of most base stations or terminals, residual self-interference is hard to avoid. Therefore, in a flexible duplex system, physical channels with strong robustness against interference (for example, an uplink control channel based on sequence correlation detection, such as physical uplink control channel formats 0 and 1 in NR) may be considered as reception signal in the flexible duplex system. Considering that the residual self-interference signal is too large, design of the uplink control channel in an existing system may not have the ability to resist high interference, so it is necessary to consider improving the existing uplink control channel.

In some embodiments, the method 500 for transmitting and/or receiving a physical channel or physical signal of the present disclosure may further include a new mapping format for uplink channel or uplink signal, which may be used to improve the reception performance of the uplink channel or uplink signal under the condition of residual self-interference. Taking an uplink control channel transmitting hybrid automatic repeat request acknowledgement (HARQ-ACK) and/or Scheduling Request (SR) as an example, the mapping format for uplink channel or uplink signal according to embodiments of the present disclosure may be used to improve the reception performance of the uplink control channel transmitting HARQ-ACK and/or SR under the condition of residual self-interference. It should be understood that the mapping format for uplink channel or uplink signal according to embodiments of the present disclosure may also be applied to any uplink control channel that transmits other control signals, or any other uplink channel or uplink signal.

In some implementations, at least one of the one or more first configuration information for transmitting and/or receiving a physical channel or physical signal obtained in step S501 may be second configuration information for frequency-domain resources for transmitting the uplink channel or uplink signal. Alternatively, the uplink channel or uplink signal transmitted by the terminal may be an uplink channel or uplink signal in a first format according to embodiments of the present disclosure, and a mapping mode of the uplink channel or uplink signal in the first format may include: generating a first sequence based on the second configuration information; and mapping the first sequence on one or more time-domain symbols for transmitting the uplink channel or uplink signal. Alternatively, the frequency-domain resources may include at least one of the following: physical resource block (PRB), physical resource block group (RBG), bandwidth part (BWP), and cell system bandwidth.

In some implementations, generating a first sequence based on the second configuration information may include: determining the total number of uplink-available subcarriers contained in frequency-domain resources for transmitting the uplink channel or uplink signal based on the second configuration information; and generating a first sequence with a first length. Alternatively, the first length may be the same as the total number of the uplink-available subcarriers.

In some implementations, mapping the first sequence on one or more time-domain symbols for transmitting the uplink channel or uplink signal may include: generating one or more second duplicate sequences of the first sequence, and mapping each of the first sequence and the one or more second duplicate sequences to frequency-domain resources for transmitting the uplink channel or uplink signal on each of the one or more time-domain symbols, respectively. Alternatively, the number of the one or more second duplicate sequences may be determined based on the number of the one or more time-domain symbols for transmitting the uplink channel or uplink signal.

The mapping mode of the uplink channel or uplink signal in the first format according to embodiments of the present disclosure will be described below with reference to specific examples.

For example, taking an uplink control channel as an example, a mapping mode of the uplink control channel in the first format according to embodiments of the present disclosure may include: a terminal obtains a physical resource block configuration for transmitting the uplink control channel, generates, according to the number of subcarriers (e.g., uplink-available subcarriers) contained in the configured physical resource blocks, one or more sequences (e.g., a first sequence (or a first sequence and one or more second duplicate sequences)) with a length same as the number of subcarriers, and mapping the one or more sequences on one or more time-domain symbols for transmitting the uplink control channel sequentially. Alternatively, each of the one or more second duplicate sequences may be the same sequence as the first sequence or a sequence with a different initial cyclic shift value generated based on the first sequence. Alternatively, each of the different initial cyclic shift values may correspond to each of the one or more time-domain symbols to which each of the one or more second duplicate sequences is respectively mapped. For example, each time-domain symbol may have a corresponding initial cyclic shift value. Alternatively, the number of subcarriers contained in the configured physical resource blocks may be the number of all the uplink-available subcarriers in the configured physical resource blocks. Alternatively, the first sequence may be associated with the uplink channel or uplink signal to be transmitted. Taking the uplink control channel for transmitting HARQ-ACK and/or SR as an example, the first sequence (and/or its duplicate sequences) may carry HARQ-ACK and/or SR information. Alternatively, the terminal may determine the cyclic shift value of the sequence transmitted by the uplink control channel according to HARQ-ACK and/or SR information bits. Further, the determined cyclic shift value may be related to the number of the configured physical resource blocks. For example, when the HARQ-ACK information bit is 0, the cyclic shift value of the sequence may be $m_{cs}=0$; and when the HARQ-ACK information bit is 1, the cyclic shift value of the sequence may be $$m_{cs} = M_{RB}^{PUCCH} N_{sc}^{RB} / 2,$$

where $$M_{RB}^{PUCCH}$$

is the number of physical resource blocks configured for the uplink control channel, and $$N_{sc}^{RB}$$

is the number of subcarriers contained in a single physical resource block.

In some implementations, a specific implementation for the terminal to obtain the second configuration information for frequency-domain resources (e.g., physical resource blocks) for transmitting the uplink channel or uplink signal may be that the terminal may obtain location information of the physical resource blocks for transmitting the uplink channel or uplink signal according to instructions of higher layer signaling and/or downlink control information. Alternatively, the location information of the physical resource blocks may include at least two of the following: an index/relative index of a starting physical resource block, the number of physical resource blocks, and an index/relative index of an ending physical resource block. Alternatively, the frequency-domain resources obtained by the terminal for transmitting the uplink channel or uplink signal may be a plurality of continuous physical resource blocks. An advantage of this uplink channel format is that it may support transmission of long-sequence uplink channels (e.g., uplink control channels) over a larger bandwidth. The longer the transmitted sequence is, the better the reception performance of the uplink channel based on sequence correlation detection is, and the better the robustness against residual self-interference is.

In some implementations, generating a first sequence based on the second configuration information may include: determining frequency-domain resources for transmitting the uplink channel or uplink signal based on the second configuration information; generating a first sequence with a second length, wherein the second length is a fixed length; and generating one or more first duplicate sequences of the first sequence with the second length. Alternatively, the total number of uplink-available subcarriers contained in the frequency-domain resources for transmitting the uplink channel or uplink signal may be determined, and the number of the one or more first duplicate sequences may be determined based on the total number of the uplink-available subcarriers and the second length. Alternatively, mapping the first sequence on one or more time-domain symbols for transmitting the uplink channel or uplink signal may include: mapping the first sequence and the one or more first duplicate sequences to frequency-domain resources for transmitting the uplink channel or uplink signal on the N-th time-domain symbol of the one or more time-domain symbols, where N is a positive integer less than or equal to the number of the one or more time-domain symbols.

In some implementations, mapping the first sequence on one or more time-domain symbols for transmitting the uplink channel or uplink signal may include: generating one or more third duplicate sequences of a third sequence, and mapping each of the third sequence and the one or more third duplicate sequences to frequency-domain resources for transmitting the uplink channel or uplink signal on each of the one or more time-domain symbols, respectively. Alternatively, the third sequence may be a combined sequence of the first sequence and the one or more first duplicate sequences. Alternatively, the number of the one or more third duplicate sequences may be determined based on the number of the one or more time-domain symbols for transmitting the uplink channel or uplink signal.

For example, taking the uplink control channel as an example, a mapping mode of the uplink control channel in the first format according to embodiments of the present disclosure may include: the terminal obtains a physical resource block configuration for transmitting the uplink control channel, generates a sequence (e.g., a first sequence) with a fixed length, and maps the sequence to one or more physical resource blocks configured within the same time-domain symbol for transmitting the uplink control channel (e.g., the N-th time-domain symbol of the one or more time-domain symbols for transmitting the uplink control channel, where N is a positive integer less than or equal to the number of the one or more time-domain symbols) repeatedly and sequentially. In other words, the terminal may generate one or more first duplicate sequences according to the generated first sequence with a fixed length, and map them to one or more physical resource blocks configured within the same time-domain symbol for transmitting the uplink control channel sequentially. The one or more first duplicate sequences may be identical to the first sequence, or sequences with different cyclic shift values generated based on the first sequence.

Alternatively, the fixed length of the generated first sequence may be an integer multiple of the number of subcarriers (for example, uplink-available subcarriers) contained in a single physical resource block. For example, the fixed length may be the same as the number of subcarriers contained in a single physical resource block, that is, the length is 12. Alternatively, the number of the one or more first duplicate sequences may be determined based on the total number of uplink-available subcarriers contained in the physical resource blocks configured for transmitting the uplink control channel and the fixed length. For example, assuming that 5 physical resource blocks are configured for transmitting the uplink control channel, and all subcarriers in each physical resource block can be used for uplink transmission, it may be determined that the total number of uplink-available subcarriers is 60. If the fixed length is 12, it may be determined that 60/12=5 sequences with the fixed length are needed within one time-domain symbol, so it may be determined that in addition to the first sequence, 4 first duplicate sequences need to be generated.

Further, similar to the example described above, when there are multiple time-domain symbols for transmitting the uplink control channel, a plurality of sequences with a fixed length may further be generated, for example, the third sequence and one or more third duplicate sequences of the third sequence. Alternatively, the third sequence may be a combined sequence of the first sequence with a fixed length and one or more first duplicate sequences thereof within the same time-domain symbol, and each of the one or more third duplicate sequences may be the same sequence as the third sequence or a sequence with a different initial cyclic shift value generated based on the third sequence. Each of the third sequence and the one or more third duplicate sequences of the third sequence may have a corresponding relationship with the time-domain symbols on which it is mapped. For example, sequences mapped on different time-domain symbols may have different cyclic shift values/initial phases, etc. Similarly, taking the uplink control channel for transmitting HARQ-ACK and/or SR as an example, the first sequence (and/or its duplicate sequences) may carry HARQ-ACK and/or SR information. Alternatively, the terminal may determine the cyclic shift values of the sequence and its first duplicate sequences transmitted by the uplink control channel according to the HARQ-ACK and/or SR information bits, for example, according to the above-mentioned manner.

Alternatively, a specific implementation for the terminal to obtain the physical resource block configuration for transmitting the uplink control channel may be that the terminal may obtain location information of physical resource blocks for transmitting the uplink control channel according to indications of higher layer signaling and/or downlink control information. Alternatively, the location information of the physical resource blocks may include at least two of the following: an index/relative index of a starting physical resource block, the number of physical resource blocks, and an index/relative index of an ending physical resource block. Alternatively, the physical resource blocks obtained by the terminal for transmitting the uplink control channel may be a plurality of continuous physical resource blocks. An advantage of this uplink channel design is that it does not need to change the sequence length according to the number of configured physical resource blocks, that is, it does not affect the generation of the sequence, which can simplify the implementation of the base station to some extent. Moreover, this uplink channel design may also improve the reception performance of uplink channel, and the larger the configured physical resource blocks are, the better the robustness of uplink control channel to residual self-interference is.

In some implementations, at least one of the one or more first configuration information for transmitting and/or receiving a physical channel or physical signal obtained in step S501 may be third configuration information for transmitting power boosting for the uplink channel or uplink signal. And the method 500 performed by the terminal in the wireless communication system may further include performing transmission power boosting for the uplink channel or uplink signal based on the third configuration information.

For example, still taking the uplink control channel as an example, the terminal may perform transmission power boosting for the uplink control channel on one or more time-domain symbols used for transmitting the uplink control channel. Herein, the transmission power boosting means that the Energy per Resource Element (EPRE) of an uplink control channel with transmission power boosting is X dB higher than that of an uplink control channel without transmission power boosting, where X may be obtained by at least one of the following: obtained by the terminal via higher layer signaling (for example, RRC signaling), obtained by the terminal by downlink control information (for example, DCI), or it is a fixed value of a protocol. The terminal may obtain configuration information (e.g., third configuration information) related to transmission power boosting for the uplink control channel, and determine whether to perform transmission power boosting for the uplink control channel. Alternatively, the terminal may obtain the configuration information related to transmission power boosting through at least one of the following: the terminal obtains it through higher layer signaling (for example, RRC signaling), the terminal obtains it through downlink control information (for example, DCI), and obtains it according to a protocol. Alternatively, the configuration information related to transmission power boosting obtained by the terminal may include at least one of the following: information indicating to enable/disable transmission power boosting for the uplink channel or uplink signal (for example, the uplink channel or uplink signal having the first format according to embodiments of the present disclosure); information indicating to enable/disable transmission power boosting for an uplink channel or uplink signal in a specific format; information indicating time units for which transmission power boosting for the uplink channel or uplink signal is applicable; and information indicating time units for which transmission power boosting for an uplink channel or uplink signal in a specific format is applicable. The uplink channel or uplink signal in a specific format described herein may include at least one of the following: uplink channel or uplink signal in the first format according to embodiments of the present disclosure, uplink control channel format 0, or uplink control channel format 1. In addition, the time unit described herein may be at least one of the following: time-domain symbol, slot, subframe, radio frame, mini-slot, etc. An advantage of this design is that by increasing the transmission power of the uplink channel or uplink signal, reception signal strength of the uplink channel or uplink signal may be improved, and the reception performance of the uplink channel or uplink signal may be guaranteed under the condition of self-interference.

In some implementations, the terminal may determine time units for transmitting the uplink channel or uplink signal based on the channel format of the uplink channel or uplink signal, and when the uplink channel or uplink signal is in a specific format, the time units for transmitting the uplink channel or uplink signal may include specific downlink time units. As mentioned above, the meaning of time unit may be at least one of the following: slot, time-domain symbol, subframe, radio frame, mini-slot, etc. For example, still taking the uplink control channel for transmitting HARQ-ACK and/or SR as an example, the terminal may determine time units for reporting HARQ-ACK and/or SR based on the channel format of the uplink control channel. For example, when the channel format of the uplink control channel is a specific format, the terminal may report HARQ-ACK and/or SR on downlink time units; otherwise, the terminal is not allowed to report HARQ-ACK and/or SR on downlink time units. Alternatively, the downlink time units may include at least one of the following: a time unit configured as downlink in a TDD uplink and downlink configuration configured by radio resource control (RRC) signaling, a time unit configured as downlink in a slot format indication (SFI) configured by DCI, a time unit configured as flexible in a TDD uplink and downlink configuration configured by RRC signaling, and on which common downlink transmission such as downlink control channel resource set (Coreset) or synchronization signal block (SSB) and the like is configured, and a time unit configured as flexible in a slot format indication (SFI) configured by DCI, and on which common downlink transmission such as downlink control channel resource set (Coreset) or synchronization signal block (SSB) and the like is configured. Alternatively, the specific format described herein may include at least one of the following: the first format according to embodiments of the present disclosure, uplink control channel format 0, or uplink control channel format 1. This design may ensure that the uplink channel (for example, the uplink control channel) is compatible with the existing NR protocol and realize flexible duplex transmission.

As mentioned above, there is a serious self-interference problem in the flexible duplex system, which will greatly affect the reception performance of the base station or terminal adopting flexible duplex communication. As shown in FIG. 4, self-interference can be classified into self-interference from the same band (hereinafter referred to as co-frequency self-interference) and self-interference from adjacent bands (hereinafter referred to as adjacent-frequency self-interference). The co-frequency self-interference is mainly determined by a linear part of the self-interference signal, but the interference strength is greater, which has a greater impact on the reception performance. However, the adjacent-frequency self-interference is mainly determined by a nonlinear part of the self-interference signal, and the interference strength is slightly smaller, which may be suppressed to some extent by increasing the guard interval between adjacent frequencies. Therefore, when the co-frequency self-interference and adjacent-frequency self-interference exist at the same time, elimination ability of the co-frequency self-interference should be ensured first.

Unlike the traditional methods of eliminating self-interference at the receiving end by antenna elimination, radio frequency elimination and digital domain elimination, the method 500 for transmitting and/or receiving a physical channel or physical signal in the present disclosure further includes an uplink and/or downlink interleaving mapping mode, which, by means of a joint design of transmission signals and reception signals, ensures that the base station or terminal adopting flexible duplex communication is free from receiving self-interference signals while receiving desired signals. It is worth noting that this design needs to make use of digital transformation characteristics and waveform characteristics of the transmission signals and the reception signals, and it is often more applicable for the linear part of the self-interference signal. Therefore, preferably, the method proposed in the present disclosure is suitable for co-frequency self-interference processing. However, the method proposed in the present disclosure may also be applicable to adjacent-frequency self-interference processing.

In some implementations, at least one of the one or more first configuration information for transmitting and/or receiving a physical channel or physical signal obtained in step S501 may be fourth configuration information for uplink and/or downlink interleaving mapping. And the method 500 may further include applying uplink and/or downlink interleaving mapping to the physical channel or physical signal based on the fourth configuration information.

In some implementations, the terminal may obtain configuration information (for example, fourth configuration information) related to uplink and/or downlink interleaving mapping, and apply uplink and/or downlink interleaving mapping on specific time-domain symbols according to the configuration information. Particularly, the way for the terminal to obtain the configuration information related to the uplink and/or downlink interleaving mapping may include at least one of the following: obtaining through RRC, MAC CE and other higher layer signaling, obtaining through downlink control information (DCI), and obtaining through a fixed value or a fixed rule of a protocol. In some examples, types of the configuration information related to uplink and/or downlink interleaving mapping obtained by the terminal may include at least one of the following: configuration information related to uplink interleaving mapping for transmitting uplink channels and/or uplink signals, configuration information related to downlink interleaving mapping for receiving downlink channels and/or downlink signals, and configuration information related to uplink and downlink interleaving mapping for transmitting uplink channels and/or uplink signals and receiving downlink channels and/or downlink signals. Alternatively, the types of configuration information that the terminal may obtain may be related to the duplex capability report of the terminal. For example, when the terminal reports an inflexible duplex capability (e.g., TDD, FDD), the types of configuration information that the terminal may obtain may be the configuration information related to uplink interleaving mapping, and/or the configuration information related to downlink interleaving mapping; and when the terminal reports a flexible duplex capability (e.g., full duplex), the types of configuration information that the terminal may obtain include the configuration information related to uplink and downlink interleaving mapping in addition to the above two types.

In some implementations, the specific content of the configuration information related to the uplink and/or downlink interleaving mapping obtained by the terminal may include at least one of the following: information indicating to enable/disable uplink and/or downlink interleaving mapping, interleaving mapping pattern for uplink and/or downlink interleaving mapping, types of physical channels for applying uplink and/or downlink interleaving mapping, types of physical signals for applying uplink and/or downlink interleaving mapping, time units for applying uplink and/or downlink interleaving mapping; and frequency units for applying uplink and/or downlink interleaving mapping. In some examples, a time unit may be at least one of the following: time-domain symbol, slot, subframe, radio frame, and mini-slot. In some examples, a frequency unit may be at least one of the following: physical resource block (PRB), physical resource block group (RBG), bandwidth part (BWP), and cell system bandwidth.

In some examples, the types of uplink and/or downlink interleaving mapping patterns may include at least one of the following: uplink and downlink interleaving mapping pattern, uplink interleaving mapping pattern, and downlink interleaving mapping pattern.

In some implementations, the time-domain symbols for transmitting uplink channels and/or uplink signals and/or receiving downlink channels and/or downlink signals may be one or more time-domain symbols, and alternatively, the interleaving mapping pattern for uplink and/or downlink interleaving mapping may include a first interleaving mapping pattern. In some implementations, the first interleaving mapping pattern may include at least one of the following: a first uplink and downlink interleaving mapping pattern, a first uplink interleaving mapping pattern and a first downlink interleaving mapping pattern.

Alternatively, the first uplink and downlink interleaving mapping pattern may be that: on each of the one or more time-domain symbols, mapping the uplink channel and/or uplink signal on a first set of subcarriers within the time-domain symbol, and mapping the downlink channel and/or downlink signal on a second set of subcarriers within the time-domain symbol, where the first set of subcarriers is one of a set of subcarriers with odd indexes within the time-domain symbol or a set of subcarriers with even indexes within the time-domain symbol, and the second set of subcarriers is a set of subcarriers other than the first set of subcarriers within the time-domain symbol.

Alternatively, the first uplink interleaving mapping pattern may be that: on each of the one or more time-domain symbols, mapping the uplink channel and/or uplink signal on a third set of subcarriers within the time-domain symbol, where the third set of subcarriers is one of a set of subcarriers with odd indexes within the time-domain symbol or a set of subcarriers with even indexes within the time-domain symbol.

Alternatively, the first downlink interleaving mapping pattern may be that: on each of the one or more time-domain symbols, mapping the downlink channel and/or downlink signal on a fourth set of subcarriers within the time-domain symbol, where the fourth set of subcarriers is one of a set of subcarriers with odd indexes within the time-domain symbol or a set of subcarriers with even indexes within the time-domain symbol.

For example, the first uplink and downlink interleaving mapping pattern may include that: within the same time-domain symbol, uplink channels and/or uplink signals are mapped to subcarriers with odd indexes, and downlink channels and/or downlink signals are mapped to subcarriers with even indexes; or, within the same time-domain symbol, uplink channels and/or uplink signals are mapped to subcarriers with even indexes, and downlink channels and/or downlink signals are mapped to subcarriers with odd indexes. Alternatively, the uplink channel may include any uplink physical channel (e.g., physical uplink control channel (PUCCH), physical uplink shared channel (PUSCH), etc.), and the uplink signal may include any uplink physical signal (e.g., sounding reference signal (SRS), demodulation reference signal (DMRS) for PUCCH, DMRS for PUSCH, etc.). In addition, alternatively, the downlink channel may include any downlink physical channel (e.g., physical downlink control channel (PDCCH), physical downlink shared channel (PDSCH), etc.), and the downlink signal may include any downlink physical signal (e.g., CSI-RS, DMRS for PDCCH, DMRS for PDSCH, etc.). In some examples, the uplink channel may be an uplink control channel (PUCCH), for example, it may be an uplink control channel with the first format according to embodiments of the present disclosure, uplink control channel format 0 or uplink control channel format 1, which is mainly due to the fact that adopting the uplink and downlink interleaving mapping mode may reduce usage efficiency of time-frequency resources, and it is more suitable for uplink or downlink signals that occupy little physical resources; meanwhile, some formats of uplink control channels do not need channel estimation, and can be directly received based on sequence correlation detection, which has higher robustness for residual adjacent-frequency self-interference signals.

Figure 6:
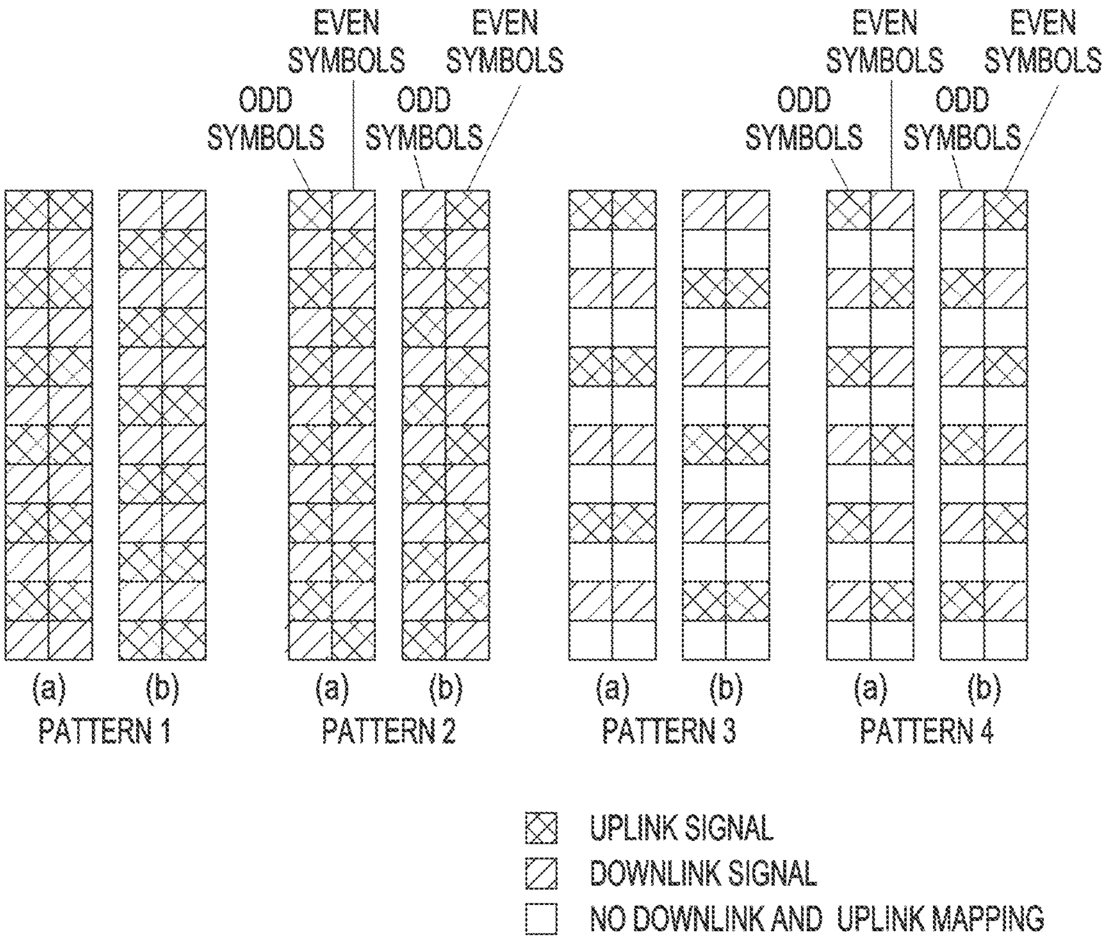
FIG. 6 illustrates an example of uplink and downlink interleaving mapping patterns according to embodiments of the present disclosure.

More specifically, FIG. 6 illustrates an example of uplink and downlink interleaving mapping patterns according to embodiments of the present disclosure. Taking the uplink signal and downlink signal as an example, in some examples, interleaving mapping modes of uplink signals and downlink signals may be the same or different within different time-domain symbols. For example, on all time-domain symbols, uplink signals are mapped to subcarriers with odd indexes and downlink signals are mapped to subcarriers with even indexes; or, on all time-domain symbols, uplink signals are mapped to subcarriers with even indexes and downlink signals are mapped to subcarriers with odd indexes, as shown in Patterns 1(a) and 1(b) of FIG. 6. In some examples, on time-domain symbols with odd indexes, uplink signals are mapped to subcarriers with odd indexes and downlink signals are mapped to subcarriers with even indexes, and on time-domain symbols with even indexes, uplink signals are mapped to subcarriers with even indexes and downlink signals are mapped to subcarriers with odd indexes, as shown in Pattern 2(b) of FIG. 6 (for example, in FIG. 6, it is assumed that subcarrier indexes start from 0 from top to bottom). Alternatively, on time-domain symbols with odd indexes, uplink signals are mapped to subcarriers with even indexes and downlink signals are mapped to subcarriers with odd indexes, and on time-domain symbols with even indexes, uplink signals are mapped to subcarriers with odd indexes and downlink signals are mapped to subcarriers with even indexes, as shown in Pattern 2(a) of FIG. 6.

In the above uplink and downlink interleaving mapping mode (for example, the first uplink and downlink interleaving mapping pattern), the uplink and downlink signals can be mapped at a frequency-domain density of ½ respectively (that is, each occupies 1 resource particle in every 2 resource particles), and frequency domain separation can be realized by the parity mapping. When an equipment performing flexible duplex communication can ensure the time domain synchronization between the transmission signal and the reception signal, according to properties of OFDM waveform (that is, Fourier transform), this mapping mode can realize time domain separation of the linear part of the self-interference signal from the desired reception signal at the receiving end of the flexible duplex equipment, that is, reception of the linear part of the self-interference is avoid. Therefore, this mapping mode may be suitable for a base station (the transmitted downlink signal is the self-interference signal, which interferes with the reception of uplink signal, and configuring timing advance for the transmission of the uplink signal may ensure the time domain synchronization between the transmission and the reception) or a cell center user terminal (the transmitted uplink signal is the self-interference signal, which interferes with the reception of downlink signal, and the short distance between the cell center user terminal and the base station can make the transmission delay of downlink signal and the timing advance of the transmission of uplink signal to be ignored, and the transmission and reception signals are approximately time domain synchronized).

In some implementations, time-domain symbols for transmitting uplink channels and/or uplink signals and/or receiving downlink channels and/or downlink signals are one or more time-domain symbols, and alternatively, the interleaving mapping pattern for uplink and/or downlink interleaving mapping may include a second interleaving mapping pattern. In some implementations, the second interleaving mapping pattern may include at least one of the following: a second uplink and downlink interleaving mapping pattern, a second uplink interleaving mapping pattern and a second downlink interleaving mapping pattern.

Alternatively, the second uplink and downlink interleaving mapping pattern may be that: on each of the one or more time-domain symbols, mapping the uplink channel and/or uplink signal on a fifth set of subcarriers within the time-domain symbol, and mapping the downlink channel and/or downlink signal on a sixth set of subcarriers within the time-domain symbol, where the fifth set of subcarriers is one of a set of subcarriers with indexes of 4 k within the time-domain symbol or a set of subcarriers with indexes of 4 k+2 within the time-domain symbol, and the sixth set of subcarriers is the other one of the set of subcarriers with indexes of 4 k within the time-domain symbol or the set of subcarriers with indexes of 4 k+2 within the time-domain symbol, where k is an integer greater than or equal to 0.

Alternatively, the second uplink interleaving mapping pattern may be that: on each of the one or more time-domain symbols, mapping the uplink channel and/or uplink signal on a seventh set of subcarriers within the time-domain symbol, where the seventh set of subcarriers is one of a set of subcarriers with indexes of 4 k within the time-domain symbol or a set of subcarriers with indexes of 4 k+2 within the time-domain symbol, where k is an integer greater than or equal to 0.

Alternatively, the second downlink interleaving mapping pattern may be that: on each of the one or more time-domain symbols, mapping the downlink channel and/or downlink signal on an eighth set of subcarriers within the time-domain symbol, where the eighth set of subcarriers is one of a set of subcarriers with indexes of 4 k within the time-domain symbol or a set of subcarriers with indexes of 4 k+2 within the time-domain symbol, where k is an integer greater than or equal to 0.

For example, still taking the uplink signal and downlink signal as an example, the second uplink and downlink interleaving mapping pattern may include that: in the same time-domain symbol, both uplink signals and downlink signals are mapped to subcarriers with even indexes (one subcarrier every 4 subcarriers is mapped (that is, every other 3 subcarriers)), and uplink signals and downlink signals are mapped on different subcarriers. Similarly, alternatively, the uplink channel may include any uplink physical channel (e.g., physical uplink control channel (PUCCH), physical uplink shared channel (PUSCH), etc.), and the uplink signal may include any uplink physical signal (e.g., SRS, demodulation reference signal (DMRS) for PUCCH, DMRS for PUSCH, etc.). In addition, alternatively, the downlink channel may include any downlink physical channel (e.g., physical downlink control channel (PDCCH), physical downlink shared channel (PDSCH), etc.), and the downlink signal may include any downlink physical signal (e.g., CSI-RS, DMRS for PDCCH, DMRS for PDSCH, etc.). Furthermore, on the time-domain symbols applied with uplink and downlink interleaving mapping, there is no uplink and downlink mapping on subcarriers with odd indexes. As a specific example, on a single physical resource block including 12 subcarriers with subcarrier indexes of 0-11 within the same time-domain symbol, uplink signals are mapped to the subcarriers with the indexes of n=0, 4, 8, and downlink signals are mapped to the subcarriers with the indexes of n=2, 6, 10; or, on the single physical resource block within the same time-domain symbol, uplink signals are mapped to the subcarriers with the indexes of n=2, 6, 10, and downlink signals are mapped to the subcarriers with the indexes of n=0, 4, 8. In some examples, the uplink channel may be an uplink control channel (PUCCH), for example, it may be an uplink control channel with the first format according to embodiments of the present disclosure, uplink control channel format 0 or uplink control channel format 1, which is mainly due to the fact that adopting the uplink and downlink interleaving mapping mode may reduce usage efficiency of time-frequency resources, and it is more suitable for uplink or downlink signals that occupy little physical resources; meanwhile, some formats of uplink control channels do not need channel estimation, and can be directly received based on sequence correlation detection, which has higher robustness for residual adjacent-frequency self-interference signals More specifically, still taking the uplink signal and downlink signal as an example, in some examples, interleaving mapping modes of uplink signals and downlink signals may be the same or different within different time-domain symbols. For example, on all time-domain symbols, within a single physical resource block, uplink signals are mapped to the subcarriers with the indexes of n=2, 6, 10, and downlink signals are mapped to the subcarriers with the indexes of n=0, 4, 8; or, on all time-domain symbols, within a single physical resource block, uplink signals are mapped to the subcarriers with the indexes of n=0, 4, 8, and downlink signals are mapped to the subcarriers with the indexes of n=2, 6, 10, as shown in Patterns 3(b) and 3(a) of FIG. 6. In some examples, on time-domain symbols with odd indexes, within a single physical resource block, uplink signals are mapped to the subcarriers with the indexes of n=2, 6, 10 and downlink signals are mapped to the subcarriers with the indexes of n=0, 4, 8, and on time-domain symbols with even indexes, within a single physical resource block, uplink signals are mapped to the subcarriers with the indexes of n=0, 4, 8 and downlink signals are mapped to the subcarriers with the indexes of n=2, 6, 10, as shown in Pattern 4(b) of FIG. 6; or, on time-domain symbols with even indexes, within a single physical resource block, uplink signals are mapped to the subcarriers with the indexes of n=2, 6, 10 and downlink signals are mapped to the subcarriers with the indexes of n=0, 4, 8, and on time-domain symbols with odd indexes, within a single physical resource block, uplink signals are mapped to the subcarriers with the indexes of n=0, 4, 8 and downlink signals are mapped to the subcarriers with the indexes of n=2, 6, 10, as shown in Pattern 4(a) of FIG. 6.

In the above uplink and downlink interleaving mapping mode (for example, the second uplink and downlink interleaving mapping pattern), the uplink and downlink signals are mapped at a frequency-domain density of ¼ (that is, each occupies 1 resource particle in every 4 resource particles), and mapped to subcarriers with even indexes with frequency domain separation. At this time, even if a flexible duplex equipment can't ensure the time domain synchronization between the transmission signal and the reception signal, according to the properties of Fourier transform, this mapping mode can also realize time domain separation of the linear part of the self-interference signal from the desired reception signal at the receiving end of the flexible duplex equipment, that is, reception of the linear part of the self-interference is avoid. Therefore, this mapping mode may be suitable for user terminals, especially those which are far away from the base station and whose uplink signal transmission is configured with large timing advance, for which the time domain synchronization between downlink signal reception and uplink signal transmission cannot be ensured at the terminal side, and the separation of linear self-interference and desired reception signal can be ensured by using the above uplink and downlink interleaving mapping mode.

Figure 7:
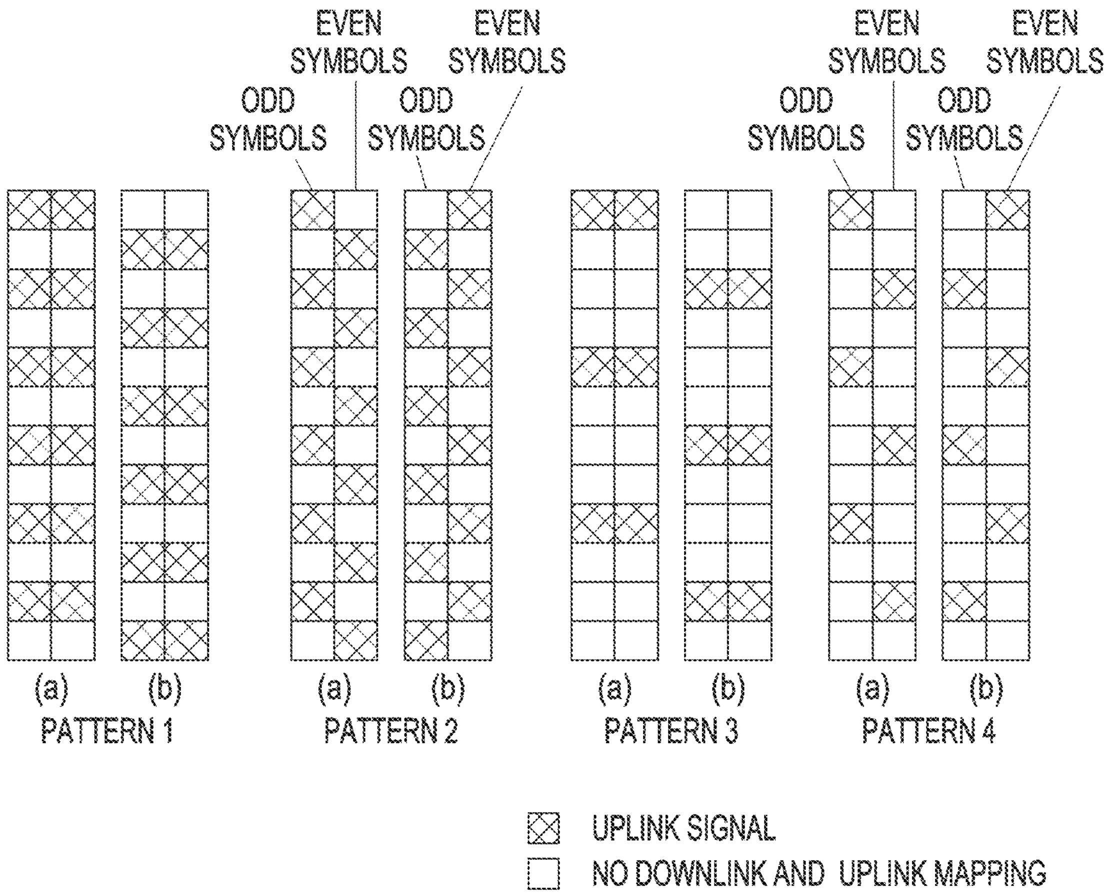
FIG. 7 illustrates an example of uplink interleaving mapping patterns according to embodiments of the present disclosure.

In addition, FIG. 7 illustrates an example of uplink interleaving mapping patterns according to embodiments of the present disclosure. For example, an instance of the uplink interleaving mapping pattern obtained by the terminal may be any one as shown in FIG. 7. For example, taking the uplink signal as an example, the first uplink interleaving mapping pattern may include that: on all time-domain symbols, uplink signals are mapped to subcarriers with odd indexes, and there is no uplink and downlink mapping on subcarriers with even indexes; or, on all time-domain symbols, uplink signals are mapped to subcarriers with even indexes, and there is no uplink and downlink mapping on subcarriers with odd indexes, as shown in Patterns 1(a) and 1(b) of FIG. 7. Alternatively, on time-domain symbols with odd indexes, uplink signals are mapped to subcarriers with odd indexes and there is no uplink and downlink mapping on subcarriers with even indexes, and on time-domain symbols with even indexes, uplink signals are mapped to subcarriers with even indexes and there is no uplink and downlink mapping on subcarriers with odd indexes, as shown in Pattern 2(b) of FIG. 7. Alternatively, on time-domain symbols with even indexes, uplink signals are mapped to subcarriers with even indexes and there is no uplink and downlink mapping on subcarriers with odd indexes, and on time-domain symbols with odd indexes, uplink signals are mapped to subcarriers with odd indexes and there is no uplink and downlink mapping on subcarriers with even indexes, as shown in Pattern 2(a) of FIG. 7. Alternatively, for example, the second uplink interleaving mapping pattern may include that: on all time-domain symbols, within a single physical resource block, uplink signals are mapped to subcarriers with the indexes of n=2, 6, 10 and there is no uplink and downlink mapping on the other subcarriers; or, on all time-domain symbols, within a single physical resource block, uplink signals are mapped to subcarriers with the indexes of n=0, 4, 8 and there is no uplink and downlink mapping on the other subcarriers, as shown in Patterns 3(b) and 3(a) of FIG. 7. Alternatively, on time-domain symbols with odd indexes, within a single physical resource block, uplink signals are mapped to subcarriers with the indexes of n=2, 6, 10 and there is no uplink and downlink mapping on the other subcarriers, and on time-domain symbols with even indexes, within a single physical resource block, uplink signals are mapped to subcarriers with the indexes of n=0, 4, 8 and there is no uplink and downlink mapping on the other subcarriers, as shown in Pattern 4(b) of FIG. 7. Alternatively, on time-domain symbols with even indexes, within a single physical resource block, uplink signals are mapped to subcarriers with the indexes of n=2, 6, 10 and there is no uplink and downlink mapping on the other subcarriers, and on time-domain symbols with odd indexes, within a single physical resource block, uplink signals are mapped to subcarriers with the indexes of n=0, 4, 8 and there is no uplink and downlink mapping on the other subcarriers, as shown in Pattern 4(a) of FIG. 7.

Figure 8:
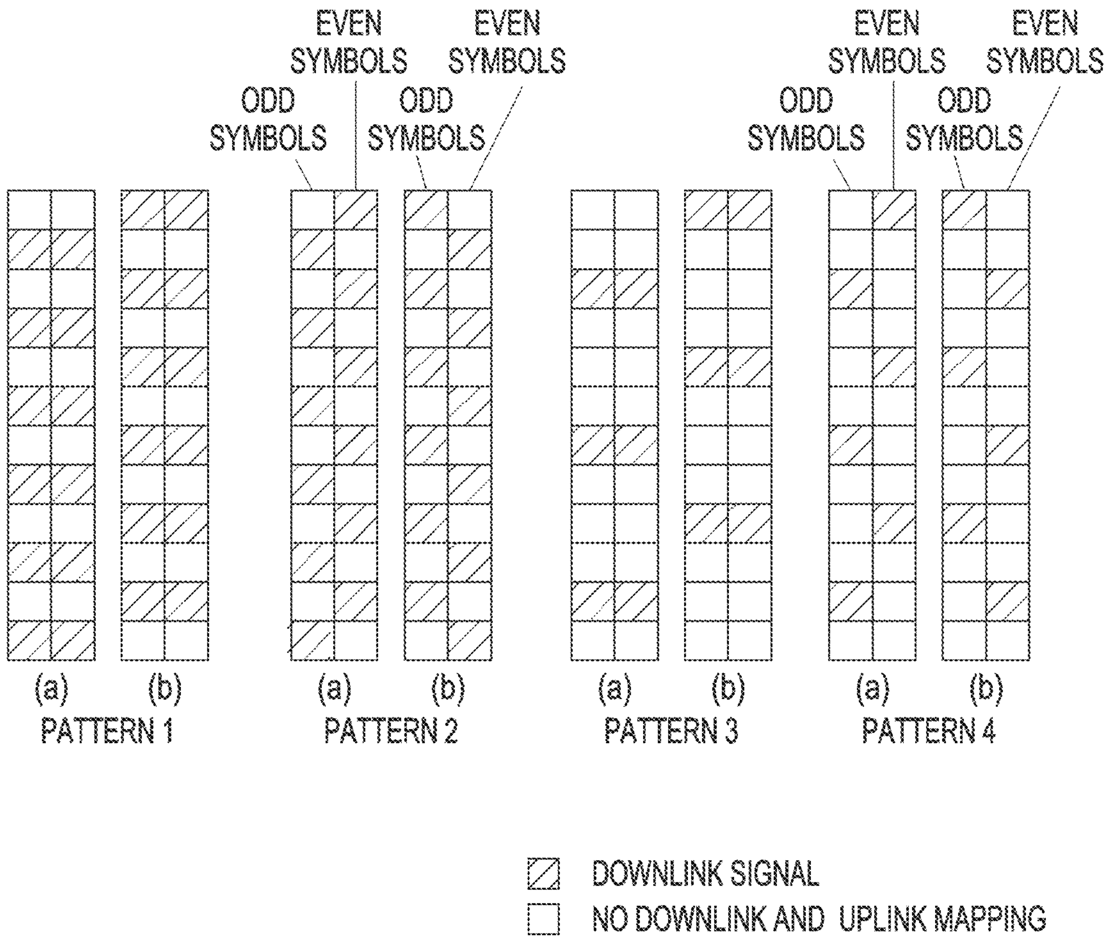
FIG. 8 illustrates an example of downlink interleaving mapping patterns according to embodiments of the present disclosure.

In addition, FIG. 8 illustrates an example of downlink interleaving mapping patterns according to embodiments of the present disclosure. For example, an example of the downlink interleaving mapping pattern obtained by the terminal may be any one as shown in FIG. 8. For example, taking the downlink signal as an example, the first downlink interleaving mapping pattern may include that: on all time-domain symbols, downlink signals are mapped to subcarriers with even indexes, and there is no uplink and downlink mapping on subcarriers with odd indexes; or, on all time-domain symbols, downlink signals are mapped to subcarriers with odd indexes, and there is no uplink and downlink mapping on subcarriers with even indexes, as shown in Patterns 1(a) and 1(b) of FIG. 8. Alternatively, on time-domain symbols with odd indexes, downlink signals are mapped to subcarriers with even indexes and there is no uplink and downlink mapping on subcarriers with odd indexes, and on time-domain symbols with even indexes, downlink signals are mapped to subcarriers with odd indexes and there is no uplink and downlink mapping on subcarriers with even indexes, as shown in Pattern 2(b) of FIG. 8. Alternatively, on time-domain symbols with odd indexes, downlink signals are mapped to subcarriers with odd indexes and there is no uplink and downlink mapping on subcarriers with even indexes, and on time-domain symbols with even indexes, downlink signals are mapped to subcarriers with even indexes and there is no uplink and downlink mapping on subcarriers with odd indexes, as shown in Pattern 2(a) of FIG. 8. Alternatively, for example, the second downlink interleaving mapping pattern may include that: on all time-domain symbols, within a single physical resource block, downlink signals are mapped to subcarriers with the indexes of n=0, 4, 8, and there is no uplink and downlink mapping on the other subcarriers; or, on all time-domain symbols, within a single physical resource block, downlink signals are mapped to subcarriers with the indexes of n=2, 6, 10, and there is no uplink and downlink mapping on the other subcarriers, as shown in Patterns 3(b) and 3(3) of FIG. 8. Alternatively, on time-domain symbols with odd indexes, within a single physical resource block, downlink signals are mapped to subcarriers with the indexes of n=0, 4, 8 and there is no uplink and downlink mapping on the other subcarriers, and on time-domain symbols with even indexes, within a single physical resource block, downlink signals are mapped to subcarriers with the indexes of n=2, 6, 10 and there is no uplink and downlink mapping on the other subcarriers, as shown in Pattern 4(b) of FIG. 8. Alternatively, on time-domain symbols with even indexes, within a single physical resource block, downlink signals are mapped to subcarriers with the indexes of n=0, 4, 8 and there is no uplink and downlink mapping on the other subcarriers, and on time-domain symbols with odd indexes, within a single physical resource block, downlink signals are mapped to subcarriers with the indexes of n=2, 6, 10 and there is no uplink and downlink mapping on the other subcarriers, as shown in Pattern 4(a) of FIG. 8.

In some implementations, obtaining time units for applying uplink and/or downlink interleaving mapping may include at least one of the following: obtaining indexes or relative indexes of time units for applying uplink and/or downlink interleaving mapping through higher layer signaling or downlink control information (DCI); determining time units configured for a specific uplink channel and/or uplink signal and a specific downlink channel and/or downlink signal as time units for applying uplink and downlink interleaving mapping; determining time units configured for a specific uplink channel and/or uplink signal as time units for applying uplink interleaving mapping; and determining time units configured for a specific downlink channel and/or downlink signal as time units for applying downlink interleaving mapping. In some examples, the time units may include at least one of the following: time-domain symbols, slots, subframes, radio frames and mini-slots. In some examples, the specific uplink channel may include uplink channel in the first format according to embodiments of the present disclosure and/or uplink control channel format 0 and/or uplink control channel format 1, etc. In some examples, the specific uplink signal may include an uplink signal in the first format according to the embodiments of the present disclosure, or any other uplink signal, such as SRS, demodulation reference signal (DMRS) for PUCCH, DMRS for PUSCH, etc. In some examples, the specific downlink channel may include any downlink control channel or downlink shared channel, such as PDCCH or PDSCH. In some examples, the specific downlink signal may include a channel state information-reference signal (CSI-RS), DMRS for PDCCH, DMRS for PDSCH, etc.

Specifically, in some examples, a specific way for the terminal to obtain time units for applying uplink and/or downlink interleaving mapping may be that the terminal obtains indexes or relative indexes of the time units for applying uplink and/or downlink interleaving mapping through higher layer signaling or downlink control information (DCI). A specific example is that the terminal obtains an indication of the time units for applying uplink and/or downlink interleaving mapping through a user group DCI, such as the DCI format indicating SFI. This design can ensure that uplink and/or downlink interleaving mapping can be applicable to more physical channels or physical signals. Taking downlink as an example, the terminal obtains indication information of the locations of time-domain symbols which need to be applied with downlink interleaving mapping among the downlink symbols or flexible symbols through a user group DCI, and the downlink interleaving mapping may be applied to all downlink channels and downlink signals including PDSCH, PDCCH, CSI-RS, etc., or the downlink interleaving mapping may only be applied to a specific downlink channel or a specific downlink signal such as PDSCH. Another specific example is that the terminal obtains an indication of time units for applying uplink interleaving mapping through DCI carrying uplink grant, and/or the terminal obtains an indication of time units for applying downlink interleaving mapping through DCI carrying downlink grant. This design can flexibly trigger the interleaving mapping, and indicate time-domain resources for applying interleaving mapping in PDSCH or PUSCH by scheduling. Another specific example is that the terminal obtains an indication of time units for applying uplink and/or downlink interleaving mapping through higher layer signaling such as RRC/MAC CE, etc. Such an indication is a semi-static indication, which is similar to the indication of a user group DCI, and also enable the interleaving mapping to be applicable to more physical channels or physical signals.

In some examples, a specific way for the terminal to obtain time units for applying uplink and/or downlink interleaving mapping may also be that: the terminal applies uplink and downlink interleaving mapping on time units for transmission of a specific uplink channel and/or uplink signal and a specific downlink channel and/or downlink signal. Taking the uplink signal as an example, a specific example is that the terminal may determine whether to apply uplink and downlink interleaving mapping on the time-domain symbols for a specific uplink signal according to the locations of the time-domain symbols for the specific uplink signal. For example, when the locations of the time-domain symbols for a specific uplink signal meets the following conditions, the terminal may apply uplink and downlink interleaving mapping on the time-domain symbols for the specific uplink signal: the time-domain symbols are time-domain symbols configured as downlink, the time-domain symbols are time-domain symbols configured as flexible and on which the control channel resource set (Coreset)/synchronization signal block (SSB) of a common search space are configured, and the time-domain symbols on which downlink signal reception is configured. Alternatively, the specific uplink signal may be uplink control channel format 0 and/or uplink control channel format 1, and/or uplink control channel in the first format according to embodiments of the present disclosure. Taking the downlink signal as an example, another specific example is that the terminal may determine whether to apply uplink and downlink interleaving mapping on the time-domain symbols for a specific downlink signal according to the locations of the time-domain symbols for the specific downlink signal. For example, when the locations of the time-domain symbols for a specific downlink signal meets the following conditions, the terminal may apply uplink and downlink interleaving mapping on the time-domain symbols for the specific downlink signal: the time-domain symbols are time-domain symbols configured as uplink, the time-domain symbols are time-domain symbols configured as flexible and on which resources for a physical random access channel are configured, and the time-domain symbols on which uplink signal reception is configured. Alternatively, the specific downlink signal may be CSI-RS, downlink control channel, etc.

In some examples, a specific way for the terminal to obtain time units for applying uplink and/or downlink interleaving mapping may also be that: the terminal determines whether to apply uplink interleaving mapping on time-domain symbols for a specific uplink channel and/or uplink signal according to the locations of the time units for transmission of the specific uplink channel and/or uplink signal; or the terminal determines whether to apply downlink interleaving mapping on time-domain symbols for a specific downlink channel and/or downlink signal according to the locations of the time units for transmission of the specific downlink channel and/or downlink signal. Taking the uplink signal as an example, a specific example is that the terminal may determine whether to apply uplink interleaving mapping on the time-domain symbols for a specific uplink signal according to the locations of the time-domain symbols for the specific uplink signal. For example, when the locations of the time-domain symbols for the specific uplink signal meets the following conditions, the terminal may apply uplink interleaving mapping on the time-domain symbols for the specific uplink signal: the time-domain symbols are time-domain symbols configured as downlink, the time-domain symbols are time-domain symbols configured as flexible and on which the control channel resource set (Coreset)/synchronization signal block (SSB) of a common search space are configured. Alternatively, the specific uplink signal may be uplink control channel format 0 and/or uplink control channel format 1, and/or uplink control channel in the first format according to embodiments of the present disclosure. Taking the downlink signal as an example, another specific example is that the terminal may determine whether to apply downlink interleaving mapping on the time-domain symbols for a specific downlink signal according to the locations of the time-domain symbols for the specific downlink signal. For example, when the locations of the time-domain symbols for the specific downlink signal meets the following conditions, the terminal may apply downlink interleaving mapping on the time-domain symbols for the specific downlink signal: the time-domain symbols are time-domain symbols configured as uplink, the time-domain symbols are time-domain symbols configured as flexible and on which a physical random access channel is configured. Alternatively, the specific downlink signal may be CSI-RS, downlink control channel, etc.

As mentioned above, there is a serious self-interference problem in the flexible duplex system, which will greatly affect the reception performance of the base station or terminal adopting flexible duplex communication, and it is necessary to adopt different transmitting or receiving methods from a traditional duplex system (such as a TDD or FDD system). For example, different powers, different channel/signal structures (e.g., the first format and the interleaving mapping patterns according to embodiments of the present disclosure as described above) are adopted, etc.

In order to give full play to the advantages of the traditional duplex system and the flexible duplex system, semi-static or dynamic switching duplex mode is needed in actual deployment. For example, in some time units (such as slots or symbols), flexible duplex mode is adopted, and in other time units (such as slots or symbols), TDD is adopted. In order to realize that the terminal can timely adjust corresponding transmitting and receiving methods under different duplex modes, the terminal may determine the duplex modes corresponding to each time-frequency resource according to higher layer signaling or physical layer signaling, and determine the corresponding transmitting and receiving methods according to a corresponding relationship between the duplex modes and specific transmitting and receiving methods. Alternatively, transmitting and receiving methods corresponding to specific time-frequency resources may be determined according to higher layer signaling or physical layer signaling.

Alternatively, the terminal may determine the duplex modes corresponding to each time-frequency resource according to higher layer signaling or physical layer signaling, where the signaling may indicate the duplex modes in each time unit, or the signaling may indicate the duplex modes in each time and frequency resource unit.

Alternatively, the terminal may determine the duplex modes corresponding to each time-frequency resource according to higher layer signaling or physical layer signaling, where the signaling may indicate the uplink and downlink configuration in each time unit or each time and frequency resource unit. The terminal may determine the duplex mode according to the uplink and downlink configuration indicated by the signaling. For example, if only one transmission direction (uplink or downlink) is configured in a time unit, the duplex mode may be determined as TDD, and if multiple transmission directions (uplink and downlink) are configured in a time unit, the duplex mode may be determined as full duplex.

A time unit may be at least one of a symbol, a sub-slot, a slot, a frame, or a set of slots. A frequency unit of a time and frequency resource unit may be at least one of a carrier, a subcarrier, a cell system bandwidth, a bandwidth part (BWP), a resource block set (RB set) and a physical resource block group (RBG group).

Alternatively, the terminal may obtain a set of various duplex modes of a base station, and obtain transmitting and receiving methods corresponding to each duplex mode. According to one implementation, the base station configures or a protocol specifies a first transmitting and receiving method, and the first transmitting and receiving method is configured by the base station or specified by the protocol to be corresponding to a predefined duplex mode, for example, corresponding to TDD or FDD. The base station configures a second transmitting and receiving method, and a duplex mode (for example, full duplex) corresponding to this method is configured by the base station or specified by the protocol.

Alternatively, signals obtained by different transmitting and receiving methods cannot be combined. In other words, signals obtained in different duplex modes cannot be jointly counted. The transmitting and receiving methods or duplex modes may be the transmitting and receiving methods or duplex modes of the base station side. Alternatively, the transmitting and receiving methods or duplex modes may be the transmitting and receiving methods or duplex modes of the terminal side.

For example, in a scenario where the terminal performs RRM measurement or CSI measurement, the RRM measurement results or CSI measurement results generated by the terminal may not include the average of measurement results obtained in different duplex modes. According to one implementation, the base station configures multiple sets of RRM or CSI reports respectively, in which one set of reports only includes measurement results in one duplex mode. The base station configures a duplex mode corresponding to the one set of reports. According to another implementation, the base station configures one set of RRM or CSI reports, and only measurement results in one duplex mode are included in each report result, and individual report results may correspond to measurement results in different duplex modes. Alternatively, when the UE reports the measurement result, it may also report the duplex mode corresponding to the measurement result.

For example, in a scenario where the terminal performs random access procedure (RACH), if the terminal transmits PRACH on resources with different duplex modes of the base station, the terminal may determine PRACH parameters according to the corresponding duplex modes, such as PRACH time-frequency resources, PRACH power parameters, PRACH power ramping step, etc. If the terminal transmits PRACH on resources with different duplex modes of the base station, the physical layer may notify the higher layer to suspend a power ramping counter, or the physical layer may notify the higher layer to suspend a preamble transmission counter. If the terminal transmits PRACH on resources with different duplex modes of the base station, for different duplex modes, the terminal may respectively maintain counters/timers/time windows of a RACH process, such as the power ramping counter, preamble transmission counter and RA response Window, etc.

Figure 9:
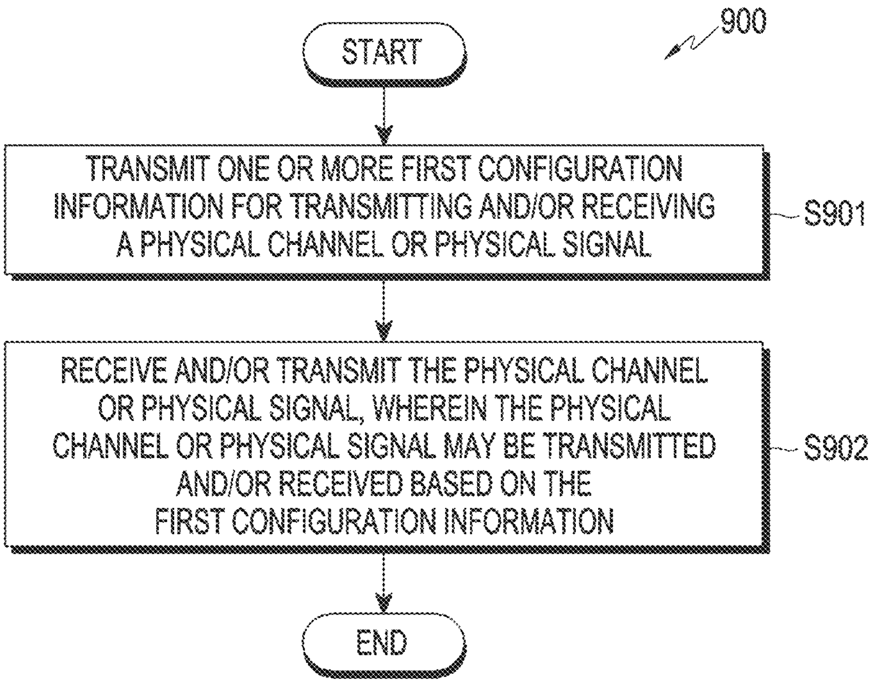
FIG. 9 illustrates a flowchart of a method for transmitting and/or receiving a physical channel or physical signal performed by a base station in a wireless communication system according to embodiments of the present disclosure.

Next, FIG. 9 illustrates a flowchart of a method 900 performed by a base station in a wireless communication system according to embodiments of the present disclosure. As shown in FIG. 9, in step S901, the base station may transmit one or more first configuration information for transmitting and/or receiving a physical channel or physical signal to a terminal, and in step S902, the base station may receive and/or transmit the physical channel or physical signal, wherein the physical channel or physical signal may be transmitted and/or received based on the first configuration information. The method 900 performed by the base station in the wireless communication system according to embodiments of the present disclosure may also include any method corresponding to the methods described above with reference to FIGS. 5-8. For example, the method 900 may include any method in which the base station configures the second configuration information, the third configuration information, the fourth configuration information and the like as described above.

Figure 10:
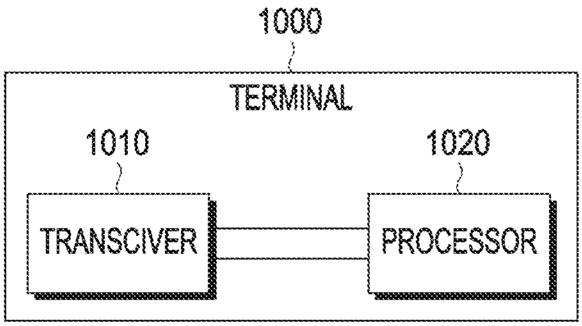
FIG. 10 illustrates a schematic diagram of a terminal according to embodiments of the present disclosure.

FIG. 10 illustrates a schematic diagram of a terminal 1000 according to embodiments of the present disclosure.

As shown in FIG. 10, a terminal 1000 according to embodiments of the present disclosure may include a transceiver 1010 and a processor 1020. The transceiver 1010 may be configured to transmit and receive signals. The processor 1020 may be configured to (e.g., control the transceiver 1010 to) perform the methods performed by the terminal according to embodiments of the present disclosure.

Figure 11:
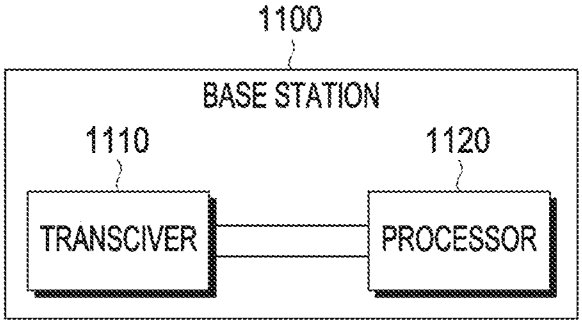
FIG. 11 illustrates a schematic diagram of a base station according to embodiments of the present disclosure.

FIG. 11 illustrates a schematic diagram of a base station 1100 according to embodiments of the present disclosure.

As shown in FIG. 11, a base station 1100 according to embodiments of the present disclosure may include a transceiver 1110 and a processor 1120. The transceiver 1110 may be configured to transmit and receive signals. The processor 1120 may be configured to (e.g., control the transceiver 1110 to) perform the methods performed by the base station according to embodiments of the present disclosure.

Embodiments of the present disclosure further provide a computer-readable medium having stored thereon computer-readable instructions which, when executed by a processor, may implement any method according to embodiments of the present disclosure.

Various embodiments of the present disclosure may be implemented as computer-readable codes embodied on a computer-readable recording medium from a specific perspective. A computer-readable recording medium is any data storage device that can store data readable by a computer system. Examples of computer-readable recording media may include read-only memory (ROM), random access memory (RAM), compact disk read-only memory (CD-ROM), magnetic tape, floppy disk, optical data storage device, carrier wave (e.g., data transmission via the Internet), etc. Computer-readable recording media can be distributed by computer systems connected via a network, and thus computer-readable codes can be stored and executed in a distributed manner. Furthermore, functional programs, codes and code segments for implementing various embodiments of the present disclosure can be easily explained by those skilled in the art to which the embodiments of the present disclosure are applied.

It will be understood that the embodiments of the present disclosure may be implemented in the form of hardware, software, or a combination of hardware and software. The software may be stored as program instructions or computer-readable codes executable on a processor on a non-transitory computer-readable medium. Examples of non-transitory computer-readable recording media include magnetic storage media (such as ROM, floppy disk, hard disk, etc.) and optical recording media (such as CD-ROM, digital video disk (DVD), etc.). Non-transitory computer-readable recording media may also be distributed on computer systems coupled to a network, so that computer-readable codes are stored and executed in a distributed manner. The medium can be read by a computer, stored in a memory, and executed by a processor. Various embodiments may be implemented by a computer or a portable terminal including a controller and a memory, and the memory may be an example of a non-transitory computer-readable recording medium suitable for storing program(s) with instructions for implementing embodiments of the present disclosure. The present disclosure may be realized by a program with code for concretely implementing the apparatus and method described in the claims, which is stored in a machine (or computer)-readable storage medium. The program may be electronically carried on any medium, such as a communication signal transmitted via a wired or wireless connection, and the present disclosure suitably includes its equivalents.

What has been described above is only the specific implementation of the present disclosure, but the scope of protection of the present disclosure is not limited thereto. Anyone who is familiar with this technical field may make various changes or substitutions within the technical scope disclosed in the present disclosure, and these changes or substitutions should be covered within the scope of protection of the present disclosure. Therefore, the scope of protection of the present disclosure should be based on the scope of protection of the claims.

The invention claimed is:

1. A method performed by a user equipment (UE) in a wireless communication system, the method comprising:

receiving, from a base station, first configuration information;

mapping a physical uplink channel in a first format; and transmitting, to the base station, the physical uplink channel based on the first configuration information, wherein the mapping of the physical uplink channel in the first format comprises:

generating a first sequence based on second configuration information included in the first configuration information;

generating at least one additional sequence based on the first sequence; and mapping the first sequence and the at least one additional sequence on at least one time-domain symbol for transmitting the physical uplink channel, and wherein the second configuration information is related to frequency-domain resources for transmitting the physical uplink channel.

2. The method of claim 1, wherein the generating of the first sequence based on the second configuration information comprises:

determining a total number of uplink-available subcarriers contained in the frequency-domain resources for transmitting the physical uplink channel based on the second configuration information; and generating the first sequence with a first length, wherein the first length is the same as the total number of the uplink-available subcarriers, and wherein the mapping of the first sequence and the at least one additional sequence on at least one time-domain symbol for transmitting the physical uplink channel comprises:

generating at least one second duplicate sequence of the first sequence as the at least one additional sequence, wherein a number of the at least one second duplicate sequence is determined based on a number of the at least one time-domain symbol; and mapping each of the first sequence and the at least one second duplicate sequence to the frequency-domain resources for transmitting the physical uplink channel on each of the at least one time-domain symbol.

3. The method of claim 1, wherein the generating of the first sequence based on the second configuration information comprises:

determining the frequency-domain resources for transmitting the physical uplink channel based on the second configuration information;

generating the first sequence with a second length, wherein the second length is a fixed length; and generating at least one first duplicate sequence of the first sequence with the second length as the at least one additional sequence, wherein the mapping of the first sequence and the at least one additional sequence on the at least one time-domain symbol for transmitting the physical uplink channel includes mapping the first sequence and the at least one first duplicate sequence to frequency-domain resources for transmitting the physical uplink channel on a N-th time-domain symbol of the at least one time-domain symbol, wherein N of the N-th time-domain symbol is a positive integer less than or equal to a number of the at least one time-domain symbol, and wherein each of the at least one first duplicate sequence is the same sequence as the first sequence or a sequence with a different cyclic shift value generated based on the first sequence.

4. The method of claim 1, further comprising obtaining location information of the frequency-domain resources for transmitting the physical uplink channel based on at least one of an indication of higher layer signaling or downlink control information, wherein the location information includes at least two of the following:

an index or a relative index of a starting physical resource block of the frequency-domain resources for transmitting the physical uplink channel, a number of physical resource blocks of the frequency-domain resources for transmitting the physical uplink channel, or an index or a relative index of an ending physical resource block of the frequency-domain resources for transmitting the physical uplink channel.

5. The method of claim 1, further comprising:

determining time units for transmitting the physical uplink channel based on a channel format of the physical uplink channel, wherein in case that the physical uplink channel is in a specific format, the time units for transmitting the physical uplink channel include specific downlink time units, wherein the specific downlink time units include at least one of the following:

a time unit configured as downlink in a time division duplex (TDD) uplink and downlink configuration configured by radio resource control (RRC) signaling;

a time unit configured as downlink in a slot format indication (SFI) configured by downlink control information (DCI);

a time unit configured as flexible in a TDD uplink and downlink configuration configured by RRC signaling, and on which common downlink transmission is configured; or a time unit configured as flexible in a slot format indication (SFI) configured by DCI, and on which common downlink transmission is configured, and wherein the specific format includes at least one of the first format, uplink control channel format 0, or uplink control channel format 1.

6. The method of claim 1, further comprising:

performing transmission power boosting for the physical uplink channel based on third configuration information, wherein the first configuration information includes the third configuration information for the transmission power boosting for the physical uplink channel, and wherein the physical uplink channel for which the transmission power boosting is performed is in at least one of the first format, uplink control channel format 0, or uplink control channel format 1.

7. The method of claim 1, further comprising:

applying uplink and/or downlink interleaving mapping based on fourth configuration information, wherein types of the fourth configuration information include at least one of the following:

uplink interleaving mapping configuration information for transmitting uplink channels and/or uplink signals;

downlink interleaving mapping configuration information for receiving downlink channels and/or downlink signals; and uplink and downlink interleaving mapping configuration information for transmitting uplink channels and/or uplink signals and receiving downlink channels and/or downlink signals, or wherein the first configuration information includes the fourth configuration information for at least one of uplink, or downlink interleaving mapping.

8. The method of claim 7, further comprising:

obtaining the fourth configuration information, wherein obtaining the fourth configuration information includes obtaining at least one of the following:

information indicating to enable or disable at least one of uplink or downlink interleaving mapping;

interleaving mapping pattern for the at least one of uplink or downlink interleaving mapping;

types of physical channels for applying the at least one of uplink or downlink interleaving mapping;

types of physical signals for applying the at least one of uplink or downlink interleaving mapping;

time units for applying the at least one of uplink or downlink interleaving mapping; or frequency units for applying the at least one of uplink or downlink interleaving mapping.

9. The method of claim 8, wherein time-domain symbols for transmitting at least one of an uplink channel or an uplink signal or receiving at least one of a downlink channel or a downlink signal are at least one time-domain symbol, and wherein the interleaving mapping pattern for the at least one of uplink or downlink interleaving mapping includes a first interleaving mapping pattern, wherein the first interleaving mapping pattern includes at least one of the following:

on each of the at least one time-domain symbol, mapping the uplink channel or uplink signal on a first set of subcarriers within the time-domain symbol, and mapping the downlink channel or downlink signal on a second set of subcarriers within the time-domain symbol, wherein the first set of subcarriers is one of a set of subcarriers with odd indexes within the time-domain symbol or a set of subcarriers with even indexes within the time-domain symbol, and the second set of subcarriers is a set of subcarriers other than the first set of subcarriers within the time-domain symbol;

on each of the at least one time-domain symbol, mapping the uplink channel or uplink signal on a third set of subcarriers within the time-domain symbol, wherein the third set of subcarriers is one of a set of subcarriers with odd indexes within the time-domain symbol or a set of subcarriers with even indexes within the time-domain symbol; or on each of the at least one time-domain symbol, mapping the downlink channel or downlink signal on a fourth set of subcarriers within the time-domain symbol, wherein the fourth set of subcarriers is one of a set of subcarriers with odd indexes within the time-domain symbol or a set of subcarriers with even indexes within the time-domain symbol.

10. The method of claim 8, wherein time-domain symbols for transmitting an uplink channel or uplink signal or receiving a downlink channel or downlink signal are at least one time-domain symbol, and wherein the interleaving mapping pattern for at least one of uplink or downlink interleaving mapping includes a second interleaving mapping pattern, wherein the second interleaving mapping pattern includes at least one of the following:

on each of the at least one time-domain symbol, mapping the uplink channel or uplink signal on a fifth set of subcarriers within the time-domain symbol, and mapping the downlink channel or downlink signal on a sixth set of subcarriers within the time-domain symbol, wherein the fifth set of subcarriers is one of a set of subcarriers with indexes of 4 k within the time-domain symbol or a set of subcarriers with indexes of 4 k+2 within the time-domain symbol, and the sixth set of subcarriers is the other one of the set of subcarriers with indexes of 4 k within the time-domain symbol or the set of subcarriers with indexes of 4 k+2 within the time-domain symbol;

on each of the at least one time-domain symbol, mapping the uplink channel or uplink signal on a seventh set of subcarriers within the time-domain symbol, wherein the seventh set of subcarriers is one of a set of subcarriers with indexes of 4 k within the time-domain symbol or a set of subcarriers with indexes of 4 k+2 within the time-domain symbol; or on each of the at least one time-domain symbol, mapping the downlink channel or downlink signal on an eighth set of subcarriers within the time-domain symbol, wherein the eighth set of subcarriers is one of a set of subcarriers with indexes of 4 k within the time-domain symbol or a set of subcarriers with indexes of 4 k+2 within the time-domain symbol, and wherein k is an integer greater than or equal to 0.

11. The method of claim 8, wherein obtaining the time units for applying the at least one of uplink or downlink interleaving mapping includes at least one of the following:

obtaining indexes or relative indexes of the time units for applying the at least one of uplink or downlink interleaving mapping through higher layer signaling or downlink control information (DCI);

determining time units configured for a specific uplink channel or uplink signal and a specific downlink channel or downlink signal as the time units for applying the at least one of uplink or downlink interleaving mapping;

determining time units configured for a specific uplink channel or uplink signal as the time units for applying uplink interleaving mapping; and determining time units configured for a specific downlink channel or downlink signal as the time units for applying downlink interleaving mapping, wherein the time units include at least one of the following: time-domain symbols, slots, subframes, radio frames, or mini-slots, and wherein the specific uplink channel includes at least one of uplink control channel format 0, uplink control channel format 1 or an uplink channel in a first format, the specific uplink signal includes an uplink signal in a first format, the specific downlink channel includes a downlink control channel, and the specific downlink signal includes a channel state information-reference signal (CSI-RS).

12. The method of claim 1, further including:

determining uplink and downlink configuration for each time-frequency resource based on higher layer signaling or physical layer signaling;

determining a duplex mode corresponding to each time-frequency resource based on the uplink and downlink configuration; and determining a transmitting and receiving mode corresponding to the time-frequency resource, based on the duplex mode corresponding to the each time-frequency resource.

13. A user equipment (UE) in a wireless communication system, the UE comprising:

a transceiver; and at least one processor coupled to the transceiver and configured to:

receive, from a base station, first configuration information, map a physical uplink channel in a first format, and transmit, to the base station, the physical uplink channel based on the first configuration information, wherein, to map the physical uplink channel in the first format, the at least one processor is further configured to:

generate a first sequence based on second configuration information included in the first configuration information, generate at least one additional sequence based on the first sequence, and map the first sequence and the at least one additional sequence on at least one time-domain symbol for transmitting the physical uplink channel, and wherein the second configuration information is related to frequency-domain resources for transmitting the physical uplink channel.

14. The UE of claim 13, wherein the at least one processor is further configured to:

determine a total number of uplink-available subcarriers contained in the frequency-domain resources for transmitting the physical uplink channel based on the second configuration information, generate the first sequence with a first length, wherein the first length is the same as the total number of the uplink-available subcarriers, generate at least one second duplicate sequence of the first sequence as the at least one additional sequence, wherein a number of the at least one second duplicate sequence is determined based on a number of the at least one time-domain symbol, and map each of the first sequence and the at least one second duplicate sequence to the frequency-domain resources for transmitting the physical uplink channel on each of the at least one time-domain symbol.

15. The UE of claim 13, wherein the at least one processor is further configured to:

determine the frequency-domain resources for transmitting the physical uplink channel based on the second configuration information, generate the first sequence with a second length, wherein the second length is a fixed length, generate at least one first duplicate sequence of the first sequence with the second length as the at least one additional sequence, and map the first sequence and the at least one first duplicate sequence to frequency-domain resources for transmitting the physical uplink channel on a N-th time-domain symbol of the at least one time-domain symbol, wherein N of the N-th time-domain symbol is a positive integer less than or equal to a number of the at least one time-domain symbol, and wherein each of the at least one first duplicate sequence is the same sequence as the first sequence or a sequence with a different cyclic shift value generated based on the first sequence.

16. The UE of claim 13, wherein the at least one processor is further configured to:

obtain location information of the frequency-domain resources for transmitting the physical uplink channel based on at least one of an indication of higher layer signaling or downlink control information, and wherein the location information includes at least two of the following:

an index or a relative index of a starting physical resource block of the frequency-domain resources for transmitting the physical uplink channel, a number of physical resource blocks of the frequency-domain resources for transmitting the physical uplink channel, or an index or a relative index of an ending physical resource block of the frequency-domain resources for transmitting the physical uplink channel.

17. The UE of claim 13, wherein the at least one processor is further configured to:

determine time units for transmitting the physical uplink channel based on a channel format of the physical uplink channel, wherein in case that the physical uplink channel is in a specific format, the time units for transmitting the physical uplink channel include specific downlink time units, wherein the specific downlink time units include at least one of the following:

a time unit configured as downlink in a time division duplex (TDD) uplink and downlink configuration configured by radio resource control (RRC) signaling;

a time unit configured as downlink in a slot format indication (SFI) configured by downlink control information (DCI);

a time unit configured as flexible in a TDD uplink and downlink configuration configured by RRC signaling, and on which common downlink transmission is configured; or a time unit configured as flexible in a slot format indication (SFI) configured by DCI, and on which common downlink transmission is configured, and wherein the specific format includes at least one of the first format, uplink control channel format 0, or uplink control channel format 1.

18. The UE of claim 13, wherein the at least one processor is further configured to:

perform transmission power boosting for the physical uplink channel based on third configuration information, wherein the first configuration information includes the third configuration information for the transmission power boosting for the physical uplink channel, and wherein the physical uplink channel for which the transmission power boosting is performed is in at least one of the first format, uplink control channel format 0, or uplink control channel format 1.

19. A method performed by a base station in a wireless communication system, the method comprising:

transmitting, to a user equipment (UE), first configuration information; and receiving, from the UE, a physical uplink channel based on the first configuration information, wherein the physical uplink channel is mapped in a first format, wherein the first configuration information includes second configuration information for frequency-domain resources for transmitting the physical uplink channel, wherein the second configuration information is used to generate a first sequence and at least one additional sequence based on the first sequence, and wherein the first sequence and the at least one additional sequence are mapped to at least one time-domain symbol for transmitting the physical uplink channel.

20. A base station in a wireless communication system, the base station comprising:

a transceiver; and at least one processor is further configured to:

transmit, to a user equipment (UE), first configuration information, and receive, from the UE, a physical uplink channel based on the first configuration information, wherein the physical uplink channel is mapped in a first format, wherein the first configuration information includes second configuration information for frequency-domain resources for transmitting the physical uplink channel, wherein the second configuration information is used to generate a first sequence and at least one additional sequence based on the first sequence, and wherein the first sequence and the at least one additional sequence are mapped to at least one time-domain symbol for transmitting the physical uplink channel.

* * * * *